(12) United States Patent
Qi et al.

(10) Patent No.: US 10,257,783 B2
(45) Date of Patent: Apr. 9, 2019

(54) COMMUNICATIONS DEVICE, COMMUNICATIONS APPARATUS OPERATING AS A RELAY NODE, INFRASTRUCTURE EQUIPMENT AND METHODS

(71) Applicant: SONY CORPORATION, Tokyo (JP)

(72) Inventors: Yinan Qi, Weybridge (GB); Atta Ul Quddus, Weybridge (GB); Muhammad Ali Imran, Weybridge (GB); Hideji Wakabayashi, Basingstoke (GB); Jussi Tapani Kahtava, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 15/320,122

(22) PCT Filed: Jun. 11, 2015

(86) PCT No.: PCT/EP2015/063090
§ 371 (c)(1),
(2) Date: Dec. 19, 2016

(87) PCT Pub. No.: WO2016/008657
PCT Pub. Date: Jan. 21, 2016

(65) Prior Publication Data
US 2017/0142653 A1 May 18, 2017

(30) Foreign Application Priority Data

Jul. 15, 2014 (EP) ..................................... 14177091

(51) Int. Cl.
*H04W 52/02* (2009.01)
*H04B 7/26* (2006.01)
(Continued)

(52) U.S. Cl.
CPC ...... *H04W 52/0212* (2013.01); *H04B 7/2606* (2013.01); *H04W 4/70* (2018.02);
(Continued)

(58) Field of Classification Search
CPC ...... H04B 7/2606; H04W 48/16; H04W 4/70; H04W 52/0212; H04W 52/46;
(Continued)

(56) References Cited

U.S. PATENT DOCUMENTS

2002/0187746 A1* 12/2002 Cheng ................... H04W 40/22
455/11.1
2009/0073916 A1* 3/2009 Zhang ................ H04B 7/15542
370/315
(Continued)

FOREIGN PATENT DOCUMENTS

| CN | 1778071 A | 5/2006 |
| EP | 1 453 246 A1 | 9/2004 |

(Continued)

OTHER PUBLICATIONS

International Search Report dated Dec. 14, 2015 in PCT/EP2015/063090.
(Continued)

*Primary Examiner* — Robert J Lopata
(74) *Attorney, Agent, or Firm* — XSENSUS LLP

(57) ABSTRACT

A communications device includes a transmitter to transmit signals representing data to an infrastructure equipment of a mobile communications network via a first wireless access interface and to transmit signals via a second wireless access interface to one or more communications apparatus which can act as relay nodes, a receiver to receive signals from the infrastructure equipment via the first wireless access interface and to receive signals via the second wireless access interface from the one or more communications apparatus
(Continued)

which can act as relay nodes, and a controller. The controller can form a relay assist request message and with the transmitter and receiver to transmit the relay assist request message on the second wireless access interface for reception by the one or more communications apparatus which can act as relay nodes to assist in communicating signals representing data to the infrastructure equipment via the first wireless access interface.

24 Claims, 11 Drawing Sheets

(51) Int. Cl.
  H04W 88/04    (2009.01)
  H04W 4/70     (2018.01)
  H04W 52/46    (2009.01)
  H04W 84/18    (2009.01)
  H04W 88/06    (2009.01)
  H04W 8/00     (2009.01)
  H04W 48/16    (2009.01)

(52) U.S. Cl.
  CPC .......... *H04W 52/46* (2013.01); *H04W 88/04* (2013.01); *H04W 8/005* (2013.01); *H04W 48/16* (2013.01); *H04W 84/18* (2013.01); *H04W 88/06* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/162* (2018.01); *Y02D 70/21* (2018.01); *Y02D 70/22* (2018.01); *Y02D 70/449* (2018.01)

(58) Field of Classification Search
  CPC ..... H04W 84/18; H04W 88/04; H04W 88/06; H04W 8/005; Y02D 70/1242; Y02D 70/1262; Y02D 70/1264; Y02D 70/142; Y02D 70/144; Y02D 70/162; Y02D 70/21; Y02D 70/22; Y02D 70/449
  USPC ........................................................ 370/311
  See application file for complete search history.

(56) References Cited

U.S. PATENT DOCUMENTS

| | | | |
|---|---|---|---|
| 2010/0061339 A1* | 3/2010 | Kim ................. | H04W 36/0005 370/331 |
| 2013/0322388 A1* | 12/2013 | Ahn .................... | H04W 76/023 370/329 |
| 2014/0171062 A1 | 6/2014 | Fallgren et al. | |
| 2015/0029866 A1* | 1/2015 | Liao ....................... | H04W 4/023 370/241 |
| 2015/0036578 A1* | 2/2015 | Wu ....................... | H04L 12/189 370/312 |
| 2015/0038136 A1* | 2/2015 | Wu ....................... | H04W 48/08 455/434 |
| 2015/0092706 A1* | 4/2015 | Chen .................... | H04W 74/02 370/329 |
| 2015/0156708 A1* | 6/2015 | Tietz ...................... | H04W 4/02 455/434 |
| 2015/0172387 A1* | 6/2015 | Ge .......................... | H04W 4/70 370/254 |
| 2015/0208332 A1* | 7/2015 | Baghel ................. | H04W 48/16 370/255 |
| 2015/0271856 A1* | 9/2015 | Tong ..................... | H04W 16/26 455/426.1 |
| 2015/0296350 A1* | 10/2015 | Chu ....................... | H04W 12/08 370/312 |
| 2016/0095022 A1* | 3/2016 | Jin ......................... | H04W 36/38 455/438 |
| 2016/0286459 A1* | 9/2016 | Enomoto .............. | H04W 8/005 |

FOREIGN PATENT DOCUMENTS

| | | |
|---|---|---|
| WO | WO 2015/113689 A1 | 8/2015 |
| WO | WO 2015/113719 A1 | 8/2015 |
| WO | WO 2015/117714 A1 | 8/2015 |
| WO | WO 2015/128134 A1 | 9/2015 |
| WO | WO 2015/139884 A1 | 9/2015 |
| WO | WO 2015/140039 A1 | 9/2015 |
| WO | WO 2015/140274 A1 | 9/2015 |
| WO | WO 2015/180890 A2 | 12/2015 |

OTHER PUBLICATIONS

A.K. Othman, et al., "Node Discovery Protocol and Localization for Distributed Underwater Acoustic Networks," Telecommunications, AICT-ICIW'06, Feb. 2006, 2 pages.

Arash Asadi, et al., "A Survey on Device-to-Device Communication in Cellular Networks," IEEE Communications Surveys & Tutorials, vol. 16, Issue 4, Apr. 2014, 2 pages.

Lei Lei, et al., "Node/Peer Discovery, Mode Selection, and Signaling for D2D Communication in LTE-A Band," Springer, http://link.springer.com/chapter/10.1007/978-3-319-04963-2_3, Apr. 2014, 4 pages.

Nirupama Bulusu, et al., "Self-Configuring Localization Systems: Design and Experimental Evaluation," ACM Transactions on Embedded Computing Systems, vol. 3, No. 1, Feb. 2004, pp. 24-60.

Michael J. McGlynn, et al., "Birthday Protocols for Low Energy Deployment and Flexible Neighbor Discovery in Ad Hoc Wireless Networks," Proceeding of the $2^{nd}$ ACM International Symposium on Mobile AdHoc Networking & Computing, (2001), pp. 137-145.

Ya Xu, et al., "Geography-informed Energy Conservation for Ad Hoc Routing," Proceeding of the $7^{th}$ Annual International Conference on Mobile Computing and Networking, (2001), 15 pages.

Vladimir Dyo, et al., "Efficient Node Discovery in Mobile Wireless Sensor Networks," Springer, http://link.springer.com/chapter/10.1007%2F978-3-540-69170-9_33 (2008), pp. 1-8.

$3^{rd}$ Generation Partnership Project; Technical Specification Group Radio Access Network; "Study on Provision of low-cost MTC UEs based on LTE"; (Release 12), 3GPP TR 36.888 V2.1.1, Jun. 2013, 55 pages.

Yinan Qi, et al., "Deployment Opportunities for Increasing Energy Efficiency in LTE-Advanced with Relay Nodes," Proceedings of WWRF, (2012), 5 pages.

Yinan Qi, et al., "$H^2$-ARQ-Relaying: Spectrum and Energy Efficiency Perspectives," IEEE J. Sel. Area. in Comm, vol. 29, No. 8, Sep. 2011, pp. 1-12.

Stefania Sesia, et al., "LTE—The UMTS Long Term Evolution from Theory to Practice," Wiley, $2^{nd}$ edition, (2011), 3 pages. (Submitting description of book only).

Bo Xing, et al., "An Experimental Study on Wi-Fi Ad-Hoc Mode for Mobile Device-to-Device Video Delivery," Proceedings of IEEE INFOCOM, Apr. 2009, 6 pages.

Search Report and Office Action issued in Chinese Application 2015800384358 dated Jun. 28, 2018.

* cited by examiner

Example deployment of UEs and operation of an ad hoc relay node

MTC UE initiated relay discovery

Signalling exchange procedure for MTC UE initiated relay discovery

Signalling exchange procedure for MTC UE initiated relay discovery

Indicator message reporting

MTC UE operation in RN discovery with RN list

Relay discovery when LTE downlink is not available

FIG. 11 Relay discovery for fixed RNs

COMMUNICATIONS DEVICE, COMMUNICATIONS APPARATUS OPERATING AS A RELAY NODE, INFRASTRUCTURE EQUIPMENT AND METHODS

CROSS-REFERENCE TO RELATED APPLICATIONS

The present application is based on PCT filing PCT/EP2015/063090 filed Jun. 11, 2015, and claims priority to European Patent Application 14 177 091.7, filed in the European Patent Office on Jul. 15, 2014, the entire contents of each of which being incorporated herein by reference.

TECHNICAL FIELD OF THE DISCLOSURE

The present disclosure relates to communications devices and methods for communicating data using communications devices, and also to communications apparatus which operate as relay nodes and methods for communicating via a relay node. The present disclosure also relates to infrastructure equipment which forms part of a mobile communications network and methods of communicating using infrastructure equipment.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly.

The anticipated widespread deployment of third and fourth generation networks has led to the parallel development of a class of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, are located in a customer's house and periodically transmit information back to a central MTC server data relating to the customers consumption of a utility such as gas, water, electricity and so on. Other examples include medical devices which are continuously or intermittently transmitting data such as for example measurements or readings from monitors via a communications network to a server, and automotive applications in which measurement data is gathered from sensors on a vehicle and transmitted via a mobile communications network to a server attached to the network.

Whilst it can be convenient for a terminal such as an MTC type terminal to take advantage of the wide coverage area provided by a third or fourth generation mobile telecommunication network, there are at present disadvantages and challenges to successful deployment. Unlike a conventional third or fourth generation communications device such as a smartphone, an MTC-type terminal is preferably relatively simple and inexpensive, having a reduced capability. In addition MTC-devices are often deployed in situations that do not afford easy access for direct maintenance or replacement, so that reliable and efficient operation can be crucial. Furthermore, while the type of functions performed by the MTC-type terminal (e.g. collecting and reporting back data) do not require particularly complex processing to perform, third and fourth generation mobile telecommunication networks typically employ advanced data modulation techniques (such as 16QAM or 64QAM) on the radio interface which can require more complex and expensive radio transceivers to implement.

It is usually justified to include such complex transceivers in a smartphone as a smartphone will typically require a powerful processor to perform typical smartphone type functions. However, as indicated above, there is now a desire to use relatively inexpensive and less complex devices to communicate using LTE type networks. Accordingly such devices may be low power or battery operated and therefore have a reduced transmission power capability compared with more conventional devices. Such MTC devices may also be deployed in remote locations where radio propagation conditions may be poor so that radio signals transmitted by the MTC device may be less likely to be receivable by a base station.

SUMMARY OF THE DISCLOSURE

According to an example embodiment of the present technique there is provided a communications device for transmitting data to a mobile communications network. The communications device comprises a transmitter configured to transmit signals representing data to an infrastructure equipment of the mobile communications network via a first wireless access interface and to transmit signals via a second wireless access interface to one or more communications apparatus which can act as relay nodes, a receiver configured to receive signals from the infrastructure equipment of the mobile communications network via the first wireless access interface and to receive signals via the second wireless access interface from the one or more communications apparatus which can act as relay nodes, and a controller. The controller is configured to form a relay assist request message and in combination with the transmitter and the receiver to transmit the relay assist request message on the second wireless access interface for reception by the one or more communications apparatus which can act as relay nodes to assist in communicating signals representing data to the infrastructure equipment via the first wireless access interface. The receiver receives from at least one of the communications apparatus, via the second wireless access interface, a relay response message providing an indication that the communications apparatus can act as a relay node for the communications device, and the transmitter transmits signals representing the data, for transmission to the infrastructure equipment, to the communications apparatus acting as a relay node via the second wireless access interface.

In some examples the relay assist request message is transmitted as a broadcast signal to any communications apparatus which can act as relay node. In other examples the relay assist request message is transmitted selectively by the communications device, after receiving an indication of available communications apparatus which can act as relay nodes from the infrastructure equipment.

Embodiments of the present technique can provide an arrangement in which a communications device can discover communications apparatus which can act as relay nodes. The communications apparatus may be predesignated or deploy or fixed relay nodes or may be communications devices themselves which are for example provided with a plurality of radio access technologies and so can form an ad-hoc relay mode. Ad hoc relay nodes are comprised of communications devices which are provided with more than one radio access technology and are configured to act as relay nodes because they are able to communicate with other communications devices and also a base station (eNodeB) or the mobile radio network. Thus the communications apparatus may itself be a mobile communications device, smart phone or wireless router. The mobile device to relay node communication may therefore be a device-to-device communication as disclosed in our co-pending European patent applications 14153010.5, 14153540.1, 14157187.7, 14154396.7, 14161202.8, 14161201.0, 14161181.4, the contents of which are incorporated herein by reference.

According to the present technique a communications device, such as an MTC-UE which is configured to transmit and receive signals in accordance with a first wireless access interface, for example, an LTE wireless access interface, is arranged to transmit and receive signals with a communications apparatus, which operates as a relay node via a second wireless access interface because the relay node includes a transmitter and receiver which is configured to operate in accordance with the second wireless access interface such as, for example, WiFi. Accordingly, the communications devices can transmit signals to the relay node, for example, on the uplink via the second wireless access interface and the relay node can then operate in accordance with the LTE standard to transmit signals received from the UEs to a base station or eNodeB via the first wireless access interface operating in accordance, for example, with the LTE standard.

Embodiments of the present technique can therefore provide an arrangement in which communications devices which are out of coverage range of an eNodeB for uplink transmissions at least can discover relay nodes which are either fixed relay nodes or ad hoc relay nodes. According to the present technique a communications device can discover one or more relay nodes within a vicinity through which radio communications is possible via a radio access interface which is different to a radio access interface which it would use to communicate with a base station of a mobile communications network. The communications device then transmits a relay assist request assistance message to the relay node which responds by performing a random access procedure as if the relay node was a communications device operating in accordance with a first wireless access interface of the mobile communications network. Following a successful random access procedure, the relay node then performs a radio resource connection establishment procedure in which it identifies the communications device for which relay assisted communications has been requested and acquires an identity of a base station. The relay node then transmits to the communications device the identity of the base station so that communications device and the base station can communicate in accordance with the first wireless access interface using the relay node which transmits and receives signals to the UE via the second wireless access interface.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
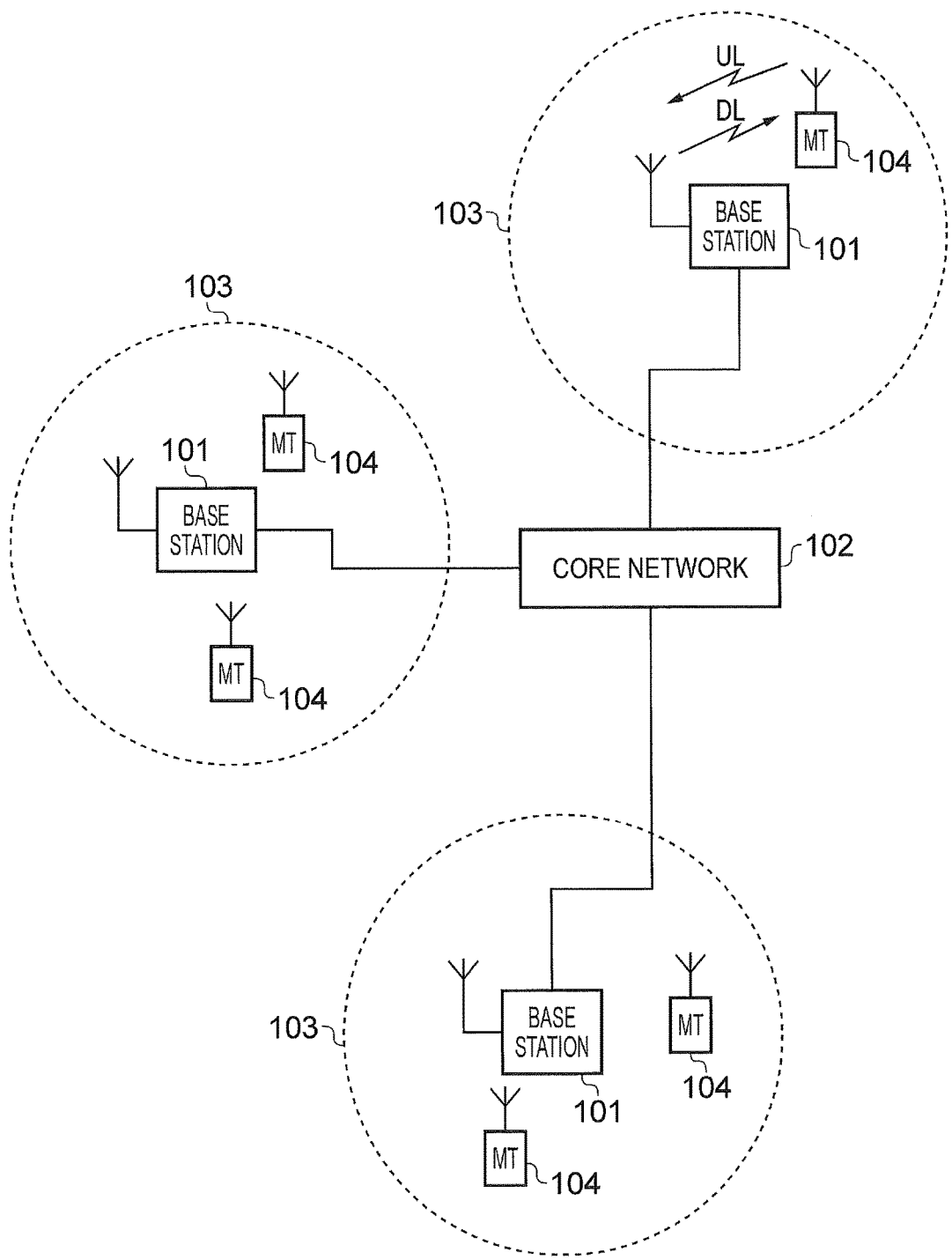
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure are denoted with the same reference numerals, and repeated explanation of these structural elements is omitted.

Example Communications System

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

As can be seen in FIG. 1, the network includes a plurality of base stations 101 connected to a core network 102. Each base station provides a coverage area 103 (i.e. a cell) within which data can be communicated to and from communications devices (also referred to as mobile terminals, MT or User Equipment, (UE) 104. Data is transmitted from base stations 101 to communications devices 104 within their respective coverage areas 103 via a radio downlink. Data is transmitted from communications devices 104 to the base stations 101 via a radio uplink. The core network 102 routes data to and from the communications devices 104 via the respective base stations 101 and provides functions such as authentication, mobility management, charging and so on.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 200 may be realized as any other types of base stations such as a NodeB and a base transceiver station (BTS). The base station 200 may include a main body (that is also referred to as a base station apparatus) configured to control radio communication, and one or more remote radio heads (RRH) disposed in a different place from the main body. In addition, various types of terminals, which will be described below, may each operate as the base station 200 by temporarily or semi-persistently executing a base station function.

For example, any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 300 may be a radio communication module (such as an integrated circuit module including a single die) mounted on each of the terminals Relay Technologies Relay technologies are known generally to provide an arrangement for receiving signals from a base station and for retransmitting the received signals to a UE in a mobile communications network, or to receive signals transmitted from a UE for re-transmission to a base station of a mobile communications network. As a result of such an arrangement a radio coverage area provided by an mobile communications network can be extended by a relay node to reach communications devices which would otherwise be out of range of the mobile communications network.

As explained above, it is desirable to extend the normal coverage of eNodeBs for machine type communications (MTC) UEs that are typically located in locations where they experience significant penetration losses. For example, electric and gas meters are often installed in locations where they suffer from poor network coverage, such as in the basements of residential buildings, beneath the staircase or even underground (below a manhole cover). To ensure MTC applications in such challenging locations, 3GPP initially identified the need for 20 dB improvement in coverage for low-cost MTC devices in comparison to defined LTE cell coverage footprint at the beginning of its study item, however finally settled on a lower value of 15 dB. For MTC coverage extension, power spectral density (PSD) boosting has been studied extensively along with other approaches such as repetition coding and it is noted that MTC UEs in extreme coverage scenarios might have characteristics such as very low data rate, greater delay tolerance and no mobility.

As disclosed in or co-pending European patent application (P104655) EP14170122.7 a multi-RAT uplink relay assisted transmission arrangement can be provided in which a relay node is used to assist a UE in relaying uplink transmission by receiving signals from a UE and re-transmitting the signals to an eNodeB as if the relay node were a UE. In this concept the MTC UE is able to receive downlink physical channels from the eNodeB but needs a relay node to relay its uplink transmissions to the eNodeB. In the downlink, coverage extension techniques, such as power boosting, may be employed so that a UE can receive the downlink signals from the eNodeB with sufficient signal strength. Accordingly the down-link follows LTE signalling protocols. However, on the uplink the UE is not able to reach or chooses not to reach the eNodeB so that there is no direct connection between the MTC UE and the eNodeB. In this regard, relay nodes (relay nodes) are deployed to facilitate the communication for two main reasons:

Energy saving due to less transmitting used by the MTC devices;
Coverage extension for those MTC devices in hostile radio environment.

If the MTC devices cannot establish LTE uplink connection with the eNodeB, they can communicate with the eNodeB via one or multiple relay nodes using radio interface technologies that are potentially different from LTE, e.g. WiFi, LTE-U etc.

Figure 2:
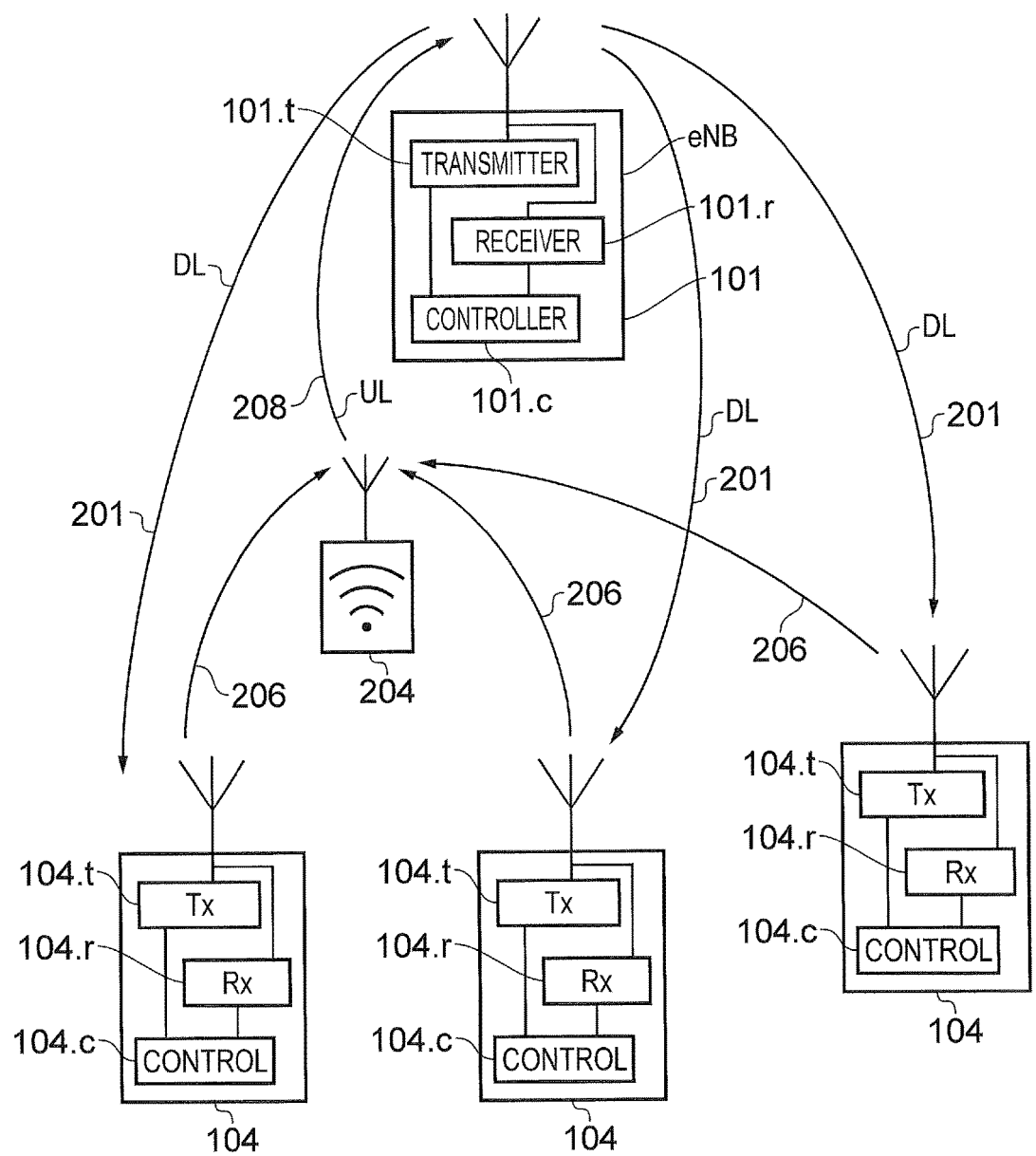
FIG. 2 provides a schematic diagram of a communications device (UE) communicating with a mobile communications network via a communications apparatus operating as a relay node.

FIG. 2 provides an example scenario in which a communications device forms an ad-hoc relay node to facilitate communication of radio signals to communications devices (UEs). In some examples the UEs may be MTC-UEs. As shown in FIG. 2 a base station or eNodeB 101 transmits downlink transmissions via an LTE-type wireless access interface to UEs 104 which as already mentioned may be MTC type UEs. The base station or eNodeB 101 includes a transmitter 101.tx, a receiver 101.tx and a controller or scheduler 101.ct. Correspondingly the UEs 104 includes a transmitter 104.tx, a receiver 104.rx and a controller 104.ct.

As mentioned above, MTC type UEs may be disposed in a remote location such as a basement of a house or within a car and therefore radio transmission and reception from the UEs may be difficult. Furthermore, MTC-UEs themselves are likely to be low power devices and therefore, for example, may be battery powered. As such, the UEs 104 may be limited in their transmission power in addition to being disposed in a location, which makes radio communications difficult. However, the eNodeB 101 is not as limited in transmission power and therefore the downlink transmission signals 201 are likely to be receivable by the UEs 104 in situations in which up-link transmissions from the MTC-UE may not reach the eNodeB 101. Accordingly, a communications apparatus may operate as a relay node 204 to receive signals from the UE 104 and retransmit the signals from the relay node 204 to the base station 101 represented by an arrow 208.

According to the present technique, the communications apparatus 204 which forms a relay node may for example communicate with the MTC UEs using a WiFi for example (IEEE802.11) or another type wireless access interface. However, the relay node 204 is also provided with a transmitter and receiver, which is able to operate in accordance with an LTE wireless access interface. Accordingly, signals transmitted by the UEs 104 can be received by the relay node 204 via the WiFi wireless access interface and retransmitted by the relay node 204 to the eNodeB 101 via the LTE uplink wireless access interface. Accordingly, the relay node 204 may operate as if the relay node were then a UE transmitting signals on the up-link in accordance with the LTE standard.

As will be appreciated from the example scenario explained above, before any Inter-RAT communication between MTC devices and an eNodeB can take place, a relay node discovery procedure may be conducted to establish the wireless connection from the MTC UE to the eNodeB. Whilst the MTC UE can discover the cell ID of a cell it is camping on under the eNodeB, it cannot start setting up a radio link with the eNodeB without knowing which of the relay nodes it should be communicating. Similarly, any paging messages forwarded via the eNodeB to the MTC UE are received but the MTC UE cannot set up a radio link without uplink connection to the eNodeB via a relay node. The present technique therefore concerns relay node discovery. As will be appreciated, in order to provide an arrangement in which a UE can use a relay node to assist up-link communication as present above, the UE first needs to discover and identify the relay node.

Relay Node Discovery

Node/Peer discovery protocols have long been used as a standard procedure for ad-hoc networks [1]-[3]. There have been many investigations in the radio network field into neighbourhood node and topology discovery. In these protocols each node broadcasts message to gain information of the network. Protocols, such as Bluetooth, propose and analyze symmetric protocols for 2-node link formation. These protocols are responsible for auto-configuration of nodes, discovery of other nodes, determining the addresses of other nodes, and maintaining reachability information about the paths to other active neighbour nodes. The discovery procedure is normally initiated by the nodes that have data traffic to send to other nodes by searching for potential peer in proximity and then determining the identification of the discovered peers. This procedure usually involves message exchange between the node pairs [4]-[7].

For machine type communication (MTC) devices, there are two crucial requirements: coverage and energy efficiency. The coverage requirement is because MTC devices are typically located in challenging locations where they suffer from significant penetration losses when installed in the basements of residential buildings. To ensure MTC coverage, 3GPP have identified the need for 15 dB improvement in coverage for low-cost MTC devices in comparison to defined LTE cell coverage footprint [8]. Energy efficiency is also a crucial aspect in MTC. The amount of energy of a MTC device may be limited by the constrained size of devices or, for instance, by the efficiency of the source of energy.

Being considered as one of the potential enabling techniques for future communication networks, relaying gives rise to a plethora of interesting applications and new business opportunities [9]-[10]. Relaying technique is standardized in 3GPP as a solution for coverage extension [11]. Relaying is also a solution that can satisfy both requirements for MTC because in addition to coverage extension, deploying relay nodes in the adjacent area of MTC devices can also reduce their transmission power to save energy. Relay can facilitate the communication between the eNodeB and the UE. However, at the beginning neither the eNodeB nor the MTC UE knows the existence of the relay nodes so that relay discovery protocols should be implemented.

Relay Node Discovery Embodiments

According to the present technique two approaches are considered for two cases:

- A UE initiated relay node discovery technique is provided, in which the relay node discovery procedure is initiated by the UEs.
- A Network initiated relay node discovery: the eNodeB maintains a dynamic list of all potential relay nodes based on the presence of relay nodes available in the cell and facilitates the relay node discovery procedure based on this list.

In one example embodiments of the present technique can provide an arrangement in which relay nodes can be chosen from different categories of user devices. This can be achieved with two cases:

- Fixed relay nodes: There are a number of relay nodes in fixed locations and the only responsibility of these relay nodes is to help the UEs in their vicinities when needed.
- Mobile relay nodes: Every LTE UE with potential of connecting to another UE (with e.g. WiFi) in the same cell can be selected as a relay node to help UEs in their vicinity whenever needed. As such these relay nodes form ad hoc relay nodes as presented above.

As will be appreciated the operation of a relay node for each of these two scenarios may be different. Fixed relay nodes are configured to receive and to transmit data received from UEs so that all signals received by the relay node represents data transmitted by a UE and so should be forwarded on the Up-link to an associate eNodeB in a conventional manner. Such Fixed relay nodes may also be arranged to receive signals on the Down-Link from the eNodeB and re-transmit these signals on the Down-Link to UEs.

For LTE UEs acting as ad hoc relay nodes, on the contrary, signals received could either be traffic targeted at that particular UEs (no forwarding is needed) or UE traffic to be forwarded to UEs needing relay support. Considering that the number of LTE UEs could be much larger than fixed relay nodes, there is a better chance for UE needing relay support to be covered. There is no fundamental difference between fixed relay nodes and LTE UEs acting as ad hoc relay nodes except that the LTE UEs are mobile. However, once both fixed relay nodes and LTE UEs able to act as ad hoc relay nodes are discovered as potential relay nodes, the fixed relay nodes might be chosen with higher priority because they are dedicated to relaying traffic for MTC UEs.

In the following explanation, although MTC UEs provide one example of communications devices which can benefit from relay assisted communications; this is just one example of a type of device. All types of communications devices can benefit from relay assisted communication and so mention of an MTC UE should not be taken as limiting the disclosed embodiments to MTC UEs, but these can be extended to all types of UE.

Example Embodiment: UE Initiated Relay Node Discovery

When a UE receives a paging message or some data enters its own transmit buffer for transmission on the Up-Link, it conducts Random Access Procedure (RAP). It is likely that the RAP will fail because of the coverage problem, in that signals transmitted by the UE on the Up-Link are not received with sufficient strength by the nearest eNode. As this point a relay node discovery procedure can be initiated by the UE. From the UE's perspective, the fixed relay nodes and the ad hoc relay nodes are similar and accordingly there is no need to differentiate these two categories in the relay discovery procedure.

Figure 3:
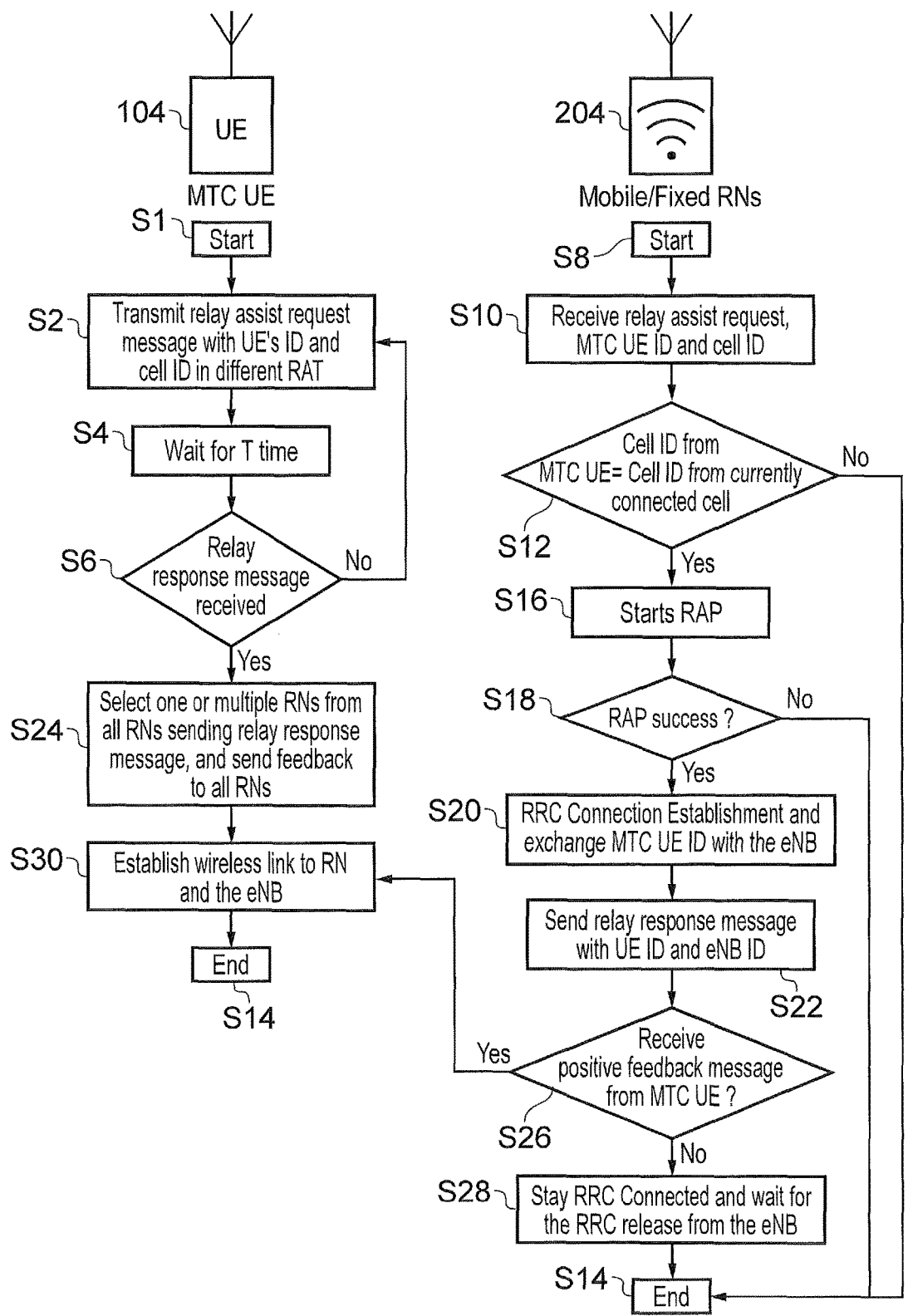
FIG. 3 is an illustrative flow diagram representing example operation of a communications device (UE) and a communications apparatus operating as a relay node, in which the communications device initiates a relay discovery process by broadcasting a relay assist request message according to the present technique.

An example embodiment of the present technique is illustrated by the flow diagram shown in FIG. 3, which provides an example operation of a UE 104 and a relay node 204. According to this example it is assumed that the fixed/mobile relay node 204 has already obtained a currently connected cell ID based on primary and secondary synchronisation signals. According to this first example embodiment, the UE 104 broadcasts a relay assist request message, which can include the relay node's own identifier and cell ID in a different radio access technology. In the case of WiFi, it is known that 802.11 WiFi can operate at two modes: infrastructure mode and ad-hoc mode [12]. When the LTE UEs operate in infrastructure mode and are connected to WiFi access points (APs), it is unlikely that they can act as relay nodes and offer help to the MTC UEs at the same time. In this regard, the UE 104 requiring Up-Link support and an LTE UEs acting as an ad hoc Relay-Node 204 should be switched into ad-hoc mode to enable direct MTC UE 104 to LTE UE 204 connection without an access point. In ad-hoc mode, UEs can actively establish an Independent Basic Service Set (IBSS) by sending relay assist request messages as for example beacon signals, which are needed to maintain synchronization, to other devices in the vicinity. Other devices can join the network after receiving a beacon and accepting the IBSS parameters found in the beacon frame. Once this IBSS is formed, which is identified by an SSID, the UE 104 can broadcast a relay assist request message in a beacon signal.

FIG. 3 provides a flow diagram showing the operations of both the UE 104 and an LTE UE 204 which operates to support uplink transmissions by the UE 104 but operating as an ad hoc relay node 204. The flow diagram shown in FIG. 3 is summarised as follows:

S1. After recognising that the UE 104 needs to use a relay node to support its uplink transmissions, in step S2 the UE broadcasts a relay assist request message, which may be in the form of an indicator bit in an existing message, requesting relay node assistance together with its own ID and a cell ID using a different radio access technology from that which is used for the uplink transmissions. For example if the NTC operates in accordance with LTE then it would normally transmit and receive signals via the LTE Radio Access Interface whereas a different radio access technology such as Wifi, Bluetooth or Zigbee could be used to communicate with a relay node.

S4. The UE 104 then waits for a predetermined time T for response from a relay node which is in its vicinity.

At decision point S6 the UE 104 determines whether it has received an acknowledgement from a relay node 204 which can act to assist its uplink transmissions. In one example the acknowledgement is provide by the relay node 204 transmitting a relay response message. If there is no feedback from a potential relay node then processing reverts back to step S2 and the UE 104 again transmits the relay assist request message as broadcast signal requesting assistance from a relay node.

S8. From a starting position S8 in which a relay node has activated its Radio Access Interface for receiving signals from UEs which could that the relay node acts to assist the uplink transmissions, at step S10, the relay node 204 receives a relay assist request message, which may include a UE ID and a cell ID from the UE 104 transmitted as a as a broadcast signal.

S12. At a first decision point S12 the relay node 204 determines whether the cell ID received from the MTC UE in the relay assist request message is the same as the cell ID of the current cell in which the relay node is deployed. For example, if the relay node 204 is an LTE UE with multiple radio access technologies then the UE will have already acquired the cell ID for communicating within the cell itself. Using for example the WiFi Radio Access Interface, the relay node 204 can therefore receive the broadcast signal from the UE 104 which includes the cell ID and therefore determines that the UE acting as a relay node is in the same cell as the UE requesting uplink assistance. If the relay node is not in the same cell as the UE 104 requesting uplink assistance then processing terminates in step S14 via the 'NO' branch.

S16. If the relay node confirms that the UE 104 requesting uplink assistance is in the same cell as the relay node, by confirming that the cell ID received in the relay assist request message, broadcast from the UE 104 is the same as the cell ID received by the relay node 204 from for example an eNodeB, then processing proceeds to step S16 in which the random access procedure is performed by the relay node 204 in order to access uplink resources of the LTE communications interface.

S18. At decision point at step S18 the relay node 204 determines whether the random access procedure was successful or not. If it was not successful then the node branch proceeds to the termination end point S18.

S20. If the relay node 204 was successful in establishing through the Radio Access Procedure (RAP) an RRC connection then this is established with the eNodeB 101 and the relay nodes 204 exchanges an identifier of the UE 104 requesting uplink assistance with the eNodeB 101 in order to establish a protocol stack corresponding to a radio resource connection (RRC) connected state as if the eNodeB 101 had a connection with the UE 104 requesting uplink assistance.

S22. The relay node 204 then sends back a relay response message, which may provide a positive indication to the UE 104 that the relay node 204 can act to assist the UE 104. The relay response message can include the relay node's own ID and an ID of the eNodeB to which it is connected which has been received from the eNodeB.

S24. Referring back to the operation of the UE 104 requesting uplink assistance, the UE 104 selects one of the one or more relay nodes 204 which it detects from relay nodes sending back relay response messages indicating that they are both within the same cell as the UE 104 and they have established a connection with the eNodeB within the cell. Accordingly, the UE 104 transmits a relay select message indicating to the relay nodes 204 whether or not the UE will use them in order to assist in the uplink transmission of data to the eNodeB.

S26. Correspondingly, if the relay node 204 receives a positive feedback from the UE as a relay select message, indicating that it has been selected to provide uplink assistance then at decision point S26, the relay node 204 determines whether or not it has been selected in accordance with the positive feedback provided by the relay select message. If no positive feedback is received from the UE 104, in the form of the relay select message, requesting uplink assistance, then processing proceeds to step S28 in which the relay node stays RRC connected without transmitting data and, after a predetermined time, waits for the RRC release from the eNodeB. Thus those relay nodes 204 that receive a negative indication in the relay response message from the MTC UE, stay RRC connected until the eNodeB initiates an RRC release because there is no data to transmit. Those relay nodes 204 that receive positive feedback through the relay response message, complete the establishment of the wireless link between the MTC UE and the relay node and the relay node and the eNodeB respectively.

S30. Therefore having received a positive indication that the relay node that has been selected by the UE, the UE establishes a radio link between the relay node and itself and correspondingly the relay node and the eNodeB. Processing then terminates in step S14.

Figure 4:
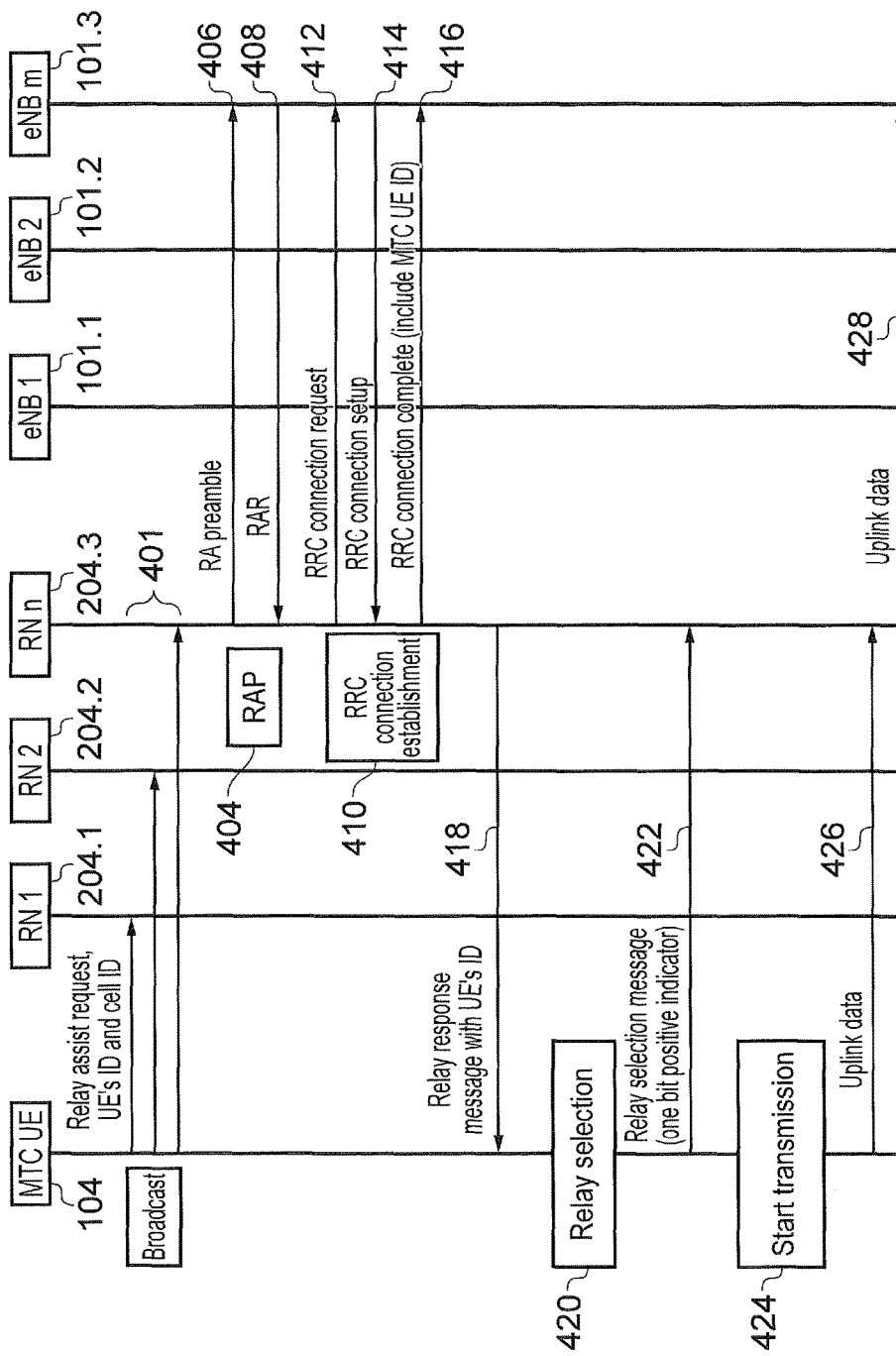
FIG. 4 is an illustrative representation of a signalling exchange between a communications device (UE), one or more communications apparatus acting as relay nodes and one or more infrastructure equipment (eNodeB) of a mobile communications network when performing the communications device initiated relay node discovery procedure according to the present technique.

A more detailed message flow diagram of the operation of the MTC UE and the relay node showing a plurality or relay nodes and correspondingly eNodeBs is showing in FIG. 4 which is summarised as follows:

As shown in FIG. 4, in a first process corresponding to steps S2 to S10 above, the MTC UE 104 broadcasts a relay assist request message 401 to any of the relay nodes which are able to receive this message 204.1, 204.2, 204.3. Thus each of the relay node 204.1, 204.2, 204.3 is able to receive the relay assist request message 104 which includes an indication (a bit indicating) that the transmitting UE 104 is requesting relay assistance which includes the UE's own ID and a cell ID in which the UE is transmitting. Each of the relay nodes 204.1, 204.2, 204.3 which receives the relay assist request message 401 performs a random access procedure 404 as represented by steps S16, S18 in FIG. 3 by transmitting a random access preamble message 406 and receives a random access response message 408 from one of the eNodeB's 101.3 to which the relay node 204.3 has established a connection. The relay node 204.3 which is successful in receiving a random access response from one of the eNodeB's 101.3 then performs an RRC connection establishment 410 transmitting an RRC connection request message 412 and receives an RRC connection set up message 414 which is followed by an RRC connection complete message 416 which includes the ID of the UE 104 which is requesting uplink assistance.

The relay node 204.3 which successfully establishes an RRC connection with the eNodeB 101.3 in the same cell as the UE 104 requesting uplink assistance then sends a relay response message 418 back to the MTC UE 104 providing a positive indication with its relay node ID. In a process 420 the eNodeB 104 requesting uplink assistance performs a relay selection process in which it identifies the relay nodes which have given a positive indication in the relay response message with its own UE ID in correspondence with step S24 and S22 showing in FIG. 3. The MTC UE 104 then sends a relay select message (for example as a one bit positive indicator in a standard signalling message) to the selected relay node 204.3, excepting that relay node 204.3 will provide the uplink assistance.

Finally in a process 424 the UE begins transmitting signals to the eNodeB 101.3 via the relay node 204.3 using messages 426 which are received by the relay node 204.3 and then transmitted via the LTE wireless access interface using a message 428.

Figure 5:
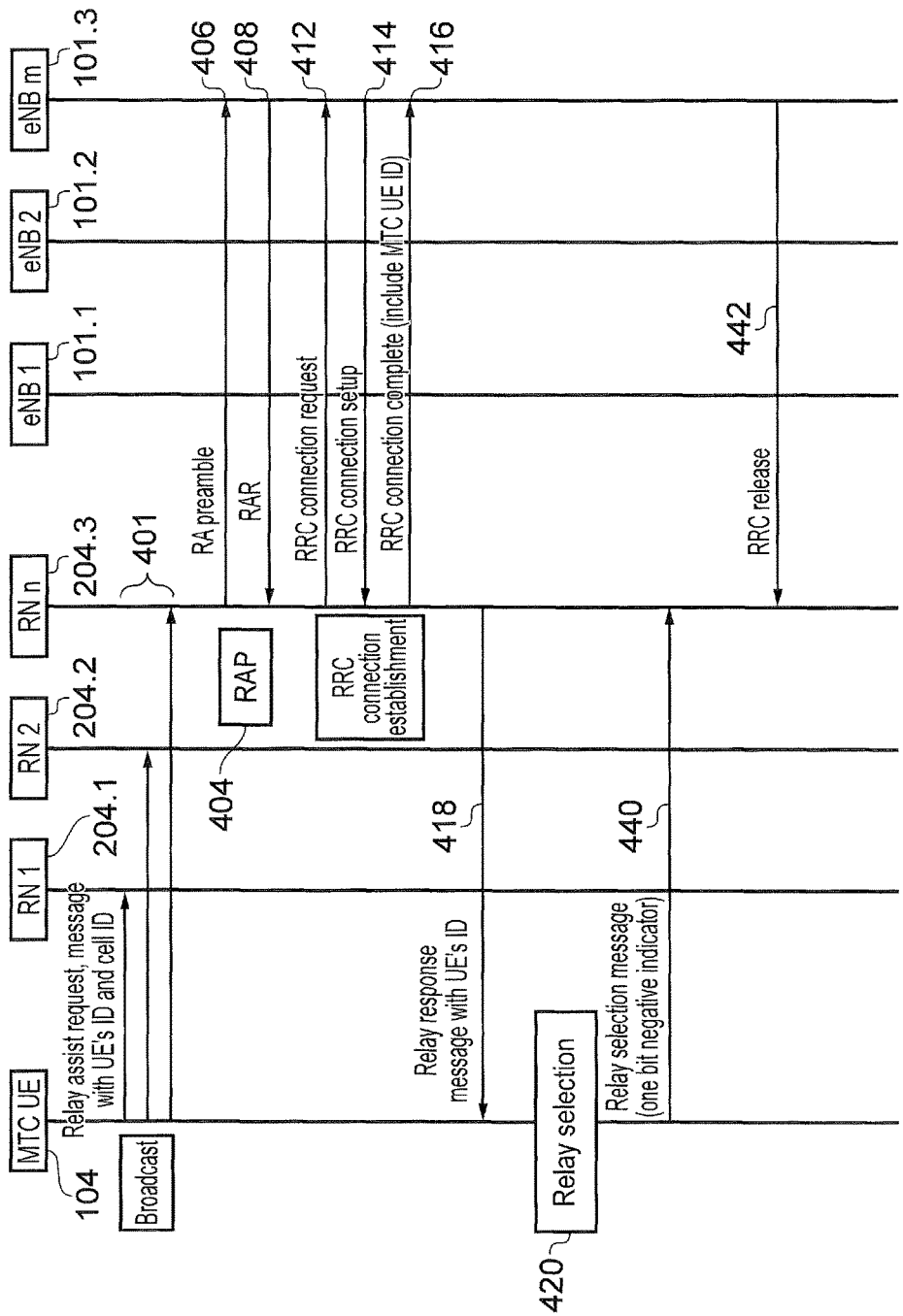
FIG. 5 is an illustrative representation of a signalling exchange between a communications device (UE), one or more communications apparatus acting as relay nodes and one or more infrastructure equipment (eNodeB) of a mobile communications network when performing the communications device initiated relay node discovery procedure of FIG. 4, which an infrastructure equipment is not selected to act as a relay node.

As indicated above with reference to the flow diagrams shown in FIG. 3, in process step S26 the relay node 204 may not receive a relay response message from the UE requesting uplink assistance 104 or may receive a negative indication in the relay response message 418 and so proceeds to step S26 in which the RRC connections state is maintained until an RRC release is provided from the eNodeB 204. Therefore a corresponding signalling message flow which is shown in FIG. 4 in which the UE selects the relay node 204.3 is shown for the case where the relay node is not selected in FIG. 5 where the same reference numerals are used to correspond to the same process steps and messages. However as shown in FIG. 5 after the relay selection has taken place 420 the UE requesting uplink assistance 104, and the UE 104 may have selected a different relay node or nodes, then the MTC UE 104 requesting uplink assistance transmits a relay response message 440 which includes for example a 1 bit negative indicator informing the relay node 204.3 that it has not been selected to support the UE with its uplink transmission. In response therefore the relay node 204.3 does not make any further RRC connection processes or does not access the radio resources provided by the RRC connection by transmitting data and therefore the eNodeB 101.3 performs the process step S28 and sends after a predetermined time an RRC release message 442.

Example Embodiment: Network Initiated Relay Node Discovery

According to the example embodiment presented above a UE 104 which is requesting assistance from a relay node transmits a relay assist request message as a beacon signal providing a request for relay assistance message for detection by any fixed relay nodes or ad hoc relay nodes which are able to detect that broadcast signal. However in some scenarios this arrangement may be disadvantageous. This is because the number of MTC UEs is expected to be very large. As a result, there might be a large number of MTC UEs requesting relay nodes at the same time. For example in case a WiFi radio access technology is used for relaying, many MTC UEs may transmit relay assist request messages as broadcast beacon signals, which may cause congestion for a receiving relay node. In addition, a large portion of the relay nodes, which detect the request for relay assistance message may then perform a Random Access Procedure (RAP) and this may correspondingly cause a significant signalling load on a base station (eNodeB) which is serving the cell. Secondly, the unselected relay nodes, which in the case of an ad hoc relay node may be an LTE UE, will have to stay RRC connected unnecessarily but transmit/receive nothing to/from the eNodeB until the RRC release message is received. In this regard, considering a property that some UEs, for example MTC devices may have very low mobility, network memory can be exploited to facilitate the relay node discovery. An eNodeB can keep a list of all fixed relay nodes and only request help from these relay nodes when MTC UE traffic occurs. However, even with these fixed relay nodes, some of the MTC devices might still not fall under the coverage area of the fixed relay nodes. In such a case, the eNodeB can keep a list of all possible relay nodes including both fixed relay nodes and ad hoc relay nodes formed from those LTE UEs that are willing to act as mobile relay nodes. As will be appreciated therefore according to some embodiments this list is no longer static and could be a dynamic list that changes from time to time. Since the downlink connection between eNodeB and MTC UE is available, this list can be sent to the MTC UE whenever it is updated.

According to this example embodiment, the UE can negotiate with the communications apparatus which have already indicated that they can act as relay nodes from the received list of potential relay nodes one by one, to avoid the two aforementioned disadvantages. According to the present technique therefore network memory can be used to assist the MTC UEs to identify possible communications apparatus which can act as relay nodes. The MTC UE keeps a list of associated LTE UEs which have served as relay nodes for many times in the past and set different priority levels to the potential relay nodes in the dynamic list based on the number of their serving times. For example, if there are two LTE UEs in the list, UE 1 has been used as an ad hoc relay node for n times and UE 2 can be used as an ad hoc relay node for n-k times. As such UE 1 will be given a higher priority and in the front position of the list. Every time the MTC UE searches for a relay node, instead of broadcasting a request for relay assistance message, it will try to connect to the LTE UE 1 first and then LTE UE 2. If both attempts fail, the MTC UE continues going through the other relay nodes provided in a maintained list of possible relay nodes. As a result it is less likely that there could be unselected relay node staying RRC connected state unnecessarily and there is also a corresponding reduction in the signalling load.

According to the present technique a procedure can be performed which comprises generally three successive stages, which are identified as follows:

Stage 1: All Potential Relay Nodes Discovery

During the first stage, all potential relay nodes covered by the same eNodeB are discovered and a list of these relay nodes formed. Both the fixed relay nodes and the LTE UEs willing to act as ad hoc relay nodes should send a reporting message to the eNodeB to identify:

Whether it is a fixed relay node or an LTE UE which is capable of acting as a relay node, because it has multiple RAT available and an appropriate configuration;

Whether a LTE UE is willing to help as a relay node.

Figure 6:
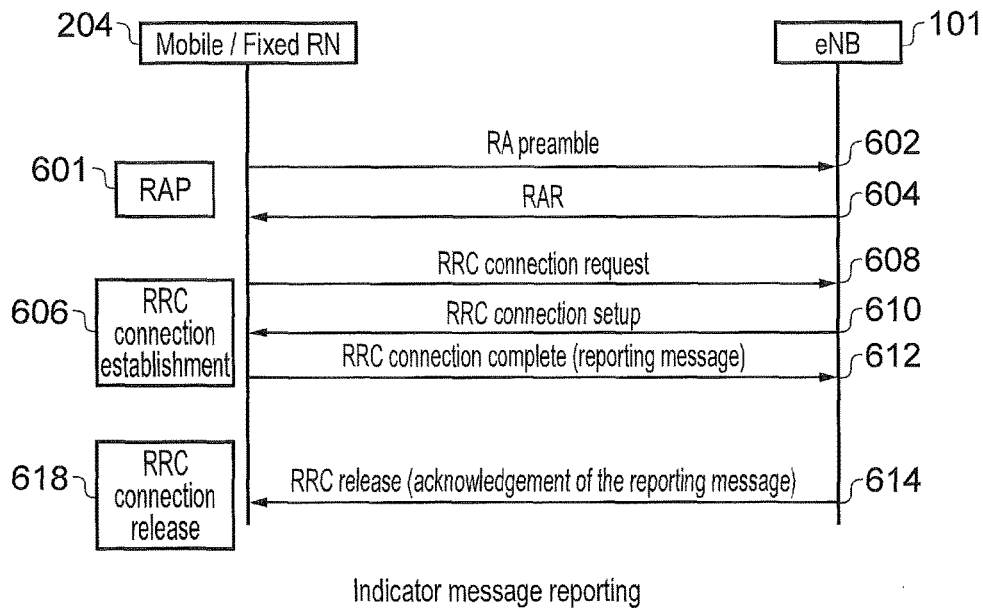
FIG. 6 is an illustrative representation of a signalling exchange between a communications apparatus acting as a relay node and an infrastructure equipment (eNodeB) of a mobile communications network when performing a process in which the communications apparatus reports its capability to act as a relay node.

The meaning of the message can be defined as:
LTE UE cannot serve as mobile relay node;
LTE UE can serve as mobile relay node;
Fixed relay node cannot serve as relay node because of hardware failure or other reasons;
Fixed relay node can serve as relay node;

This message can be sent once the LTE UEs enters a cell or periodically after hands over during the RRC connection establishment procedure as shown in FIG. 6.

As shown in FIG. 6 a message exchange takes place between an LTE UE acting as an ad hoc relay node or a fixed relay node 204 and an eNodeB which is able to communicate with a relay node 204. In accordance with a conventional arrangement, the relay node 204 performs a random access procedure 601 by transmitting a random access preamble in a message 602 to the eNodeB 101 and receives a random access response message 604. The relay node 204 then performs an RRC connection establishment procedure 606 in accordance with a conventional arrangement by transmitting an RRC connection request message 608 receiving an RRC connection set up response message 610. As part of the RRC connection establishment message the relay node then sends an RRC connection complete message 612 in which it indicates to the eNodeB its status to act as a relay node because it is a fixed relay node or because it is a UE which has the capability to act as a relay node with the correct configuration and with multiple radio access technologies. The eNodeB 101 then sends an RRC connection release message 614 in which it acknowledges the reporting message to the relay node that it can act as a relay node. The relay node then performs an RRC connection release procedure releasing the resources which have been previously been allocated to it as part of the RRC connection establishment 618.

For the fixed relay node, the example reporting procedure can be executed only once. Once the eNodeB finds out that the reporting equipment is a fixed relay node, it puts the equipment's ID into a list of available relay nodes and no further reporting is expected. For the LTE UEs acting as ad hoc relay nodes, the reporting would happen every time the relay nodes enter a cell (event basis) or should be done periodically after expiry of a predetermined time $T_{rep}$. Correspondingly, unless the eNodeB of the cell receives this report for more than this period $T_{rep}$, the LTE UE's identifier will be removed from the list of available relay nodes for the cell. Since fixed relay nodes are dedicated for operating to relay signals for UEs, these fixed relay nodes should be given higher priority in the list of available relay nodes. Table 1 gives an example of the list, where the F bit indicates if the equipment is a fixed relay node or not.

TABLE 1

A list of potential relay nodes

| F | ID (e.g. International Mobile Subscriber Identity (IMSI), 15 digits) |
|---|---|
| 1 | {Mobile Country Code (MCC)}{Mobile Network Code (MNC)}{European standard/North American standard}{mobile station identification number (MSIN)} |
| 1 | XXXXXXXXXXXXXXX |
| 0 | YYYYYYYYYYYYYYY |
| 0 | ZZZZZZZZZZZZZZZ |

Stage 2: Relay Node List Announcing and Updating

Once the relay node list is successfully formed, the eNodeB for the cell of the network is configured to transmit data representing this list of available relay nodes to the MTC UEs. This list can be carried in system information blocks (SIBs) such as e.g. SIB 13 for information on MBMS reception. The specifications may be extended by a new SIB or a suitable, existing SIB may be extended. Once the MTC UEs have the complete list, there is no need to resend the whole list again. The eNodeB can send the changes in system information and ask the MTC UEs via paging message to read the changes from system information, which will reduce the signalling overhead required.

Stage 3: Relay Node Discovery

As will be appreciated, providing the UEs which require relay assistance with a list of available relay nodes negates the need for the UEs to transmit a request for relay assistance message to establish contact with potential relay nodes. Therefore the first sets S10 to S22 associated with establishing relay nodes which are available is replaced by establishing the list of available relay nodes at the eNodeB. As such the network memory, which includes identifiers of the Fixed relay nodes/ad hoc relay nodes (LTE UEs) which have served as relay nodes in the past should be accumulated at the UEs which require relay assistance such as MTC UEs. The relay nodes which are available can be differentiated with the effect of receiving a preference using a serving number $n_s$ so that more preferred relay nodes can receive a high serving number $n_s$ or vice versa. Here we assume that the MTC UEs have acquired such memory and adjust the priority of the relay node list according to two rules:

Fixed relay nodes/LTE UEs with larger $n_s$ are given higher priority;

Fixed relay nodes are given higher priority than LTE UEs if they have the same $n_s$.

Once the relay node list is ready, the relay node linkage can be conducted by the MTC UE. In one example this can be achieved using a process performed by the UE which is represented in FIG. 7.

Figure 7:
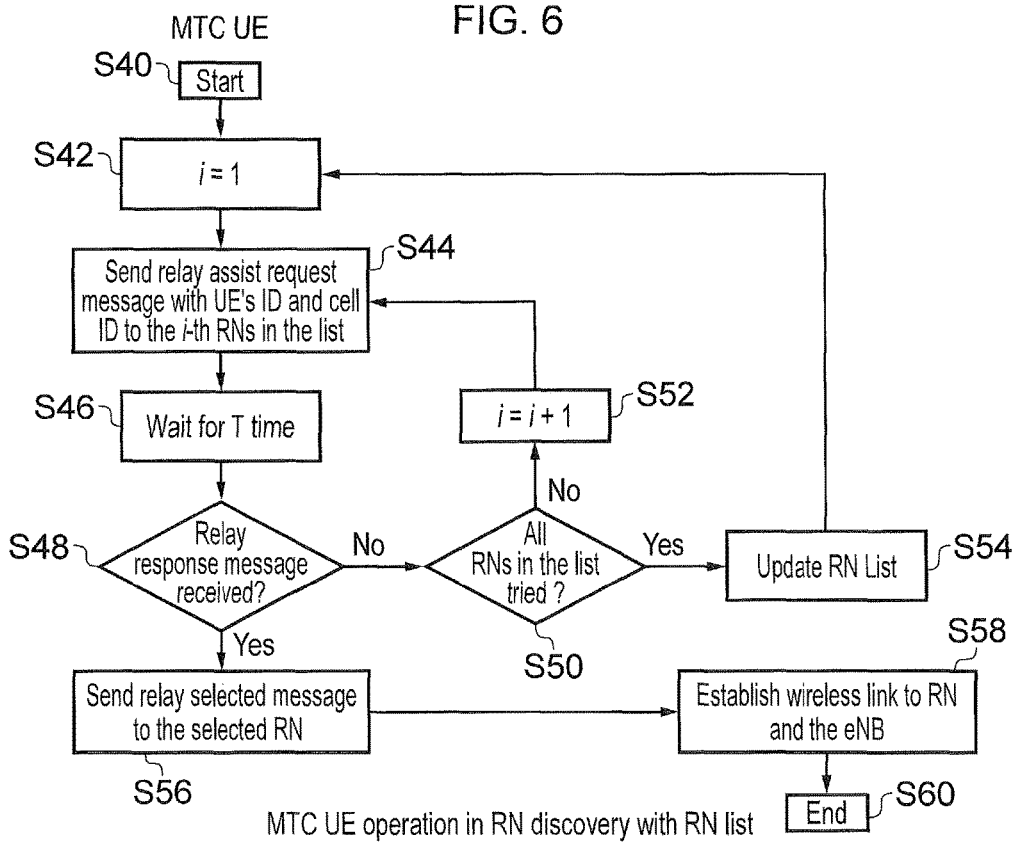
FIG. 7 is an illustrative flow diagram representing an example operation of a communications device (UE), in which the communications device performs a relay discovery process using a list of possible communications apparatus which can act as a relay node according to the present technique.

The flow diagram presented in FIG. 7 which represents an example process performed by a UE in order to establish a wireless link to a relay node using a list of available relay nodes which is shown in FIG. 7 is summarised as follows:

S40. After beginning the process because for example the UE has data to transmit to the eNodeB, the UE initialises a variable to cycle through the list of available relay nodes for example i=1 in step S42.

S44. The UE transmits a relay assist request message requesting relay assistance to the i-th relay node with an indication of the UE's own identification and a cell identifier. The UE transmits the relay assist request message to each of the possible relay nodes on the list in turn, one after the other, or in an alternative arrangement one or more may be transmitted contemporaneously.

S46. The UE then begins a wait time to determine whether a relay response message is received from the i-th relay node.

S48. At decision point S48 the UE determines whether it has received a relay response message providing feedback from the i-th relay node or not. If no feedback has been received then processing proceeds to decision point S50. At S50 the UE determines whether all relay nodes have been tried. If not then i is incremented in step S2 and processing proceeds from step S44 again. If all relay nodes have been tried, then the UE updates its list of available relay nodes in step S54 and processing proceeds back to the i-th relay node in step S42.

S56. If feedback was received from the i-th relay node as a relay response message then the UE sends a relay select message to the relay node to select this relay node. Processing then proceeds to step S58 where the UE establishes a wireless link to the relay node and the relay node establishes an RRC connection set up with the eNodeB as for the first example embodiment described with reference to FIG. 3. Otherwise processing ends at step S60.

According to one example embodiment, if after all the potential relay nodes have been tried and still no relay node is found for the MTC UE, the relay node list can be updated before the MTC UE conducts another search.

Figure 8:
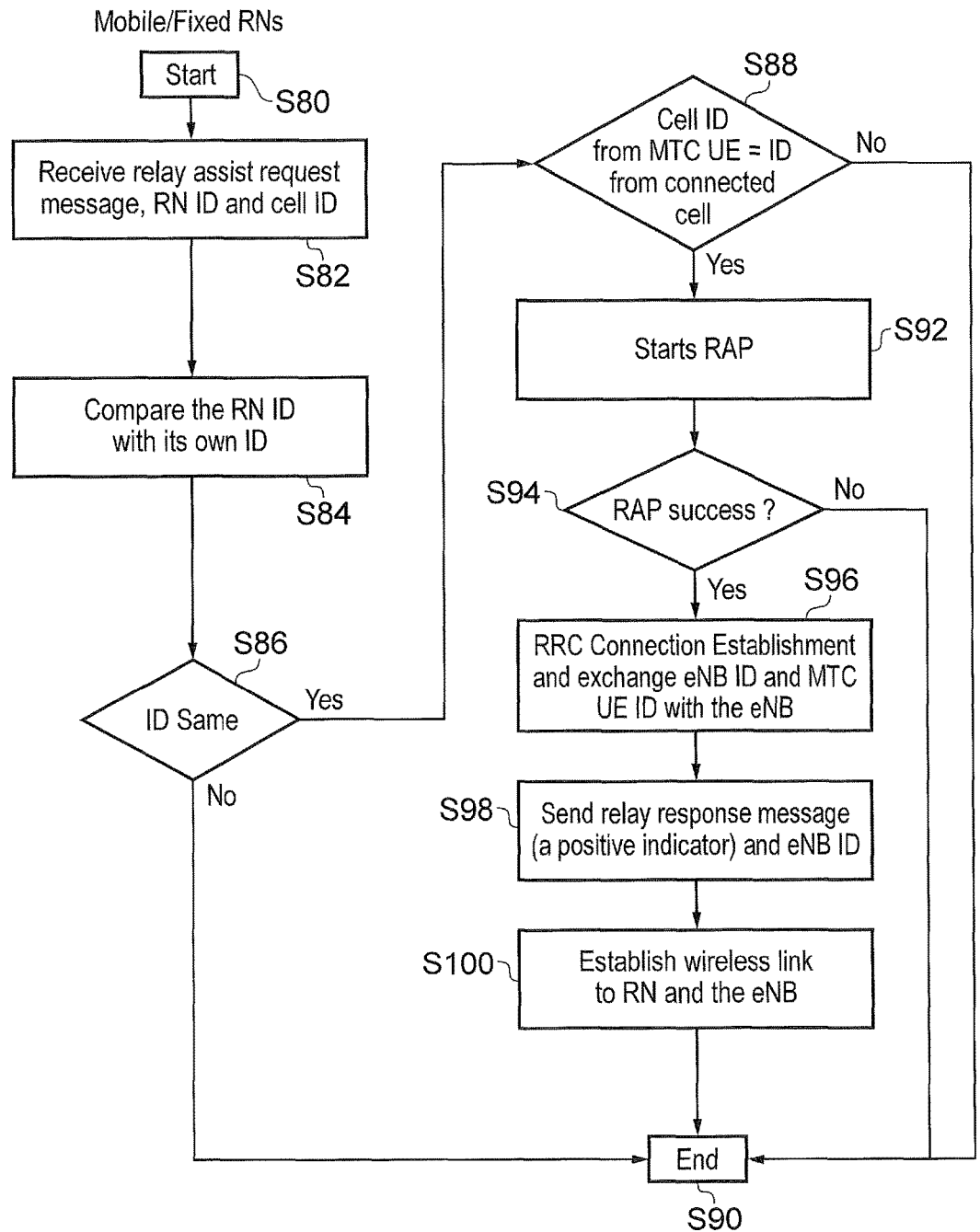
FIG. 8 is an illustrative flow diagram representing example an operation of a communications apparatus operating as a relay node in response to a relay assist request message transmitted by a communications device in a relay discovery process using a list of possible communications apparatus which can act as a relay node according to the present technique.

From the side of the relay node, an embodiment of the present technique which operates in accordance with an established list of available relay nodes for a cell is correspondingly shown in FIG. 8. The flow chart shown in FIG. 8 is summarised as follows:

S80. From a starting position, the relay node 204 which is monitoring transmissions from UE's within range receives at step S82 a relay assist request message (an indicator bit) indicating that the UE which transmitted the message requires assistance from the relay node to transmit on the uplink to the eNodeB for the cell. The relay node receives the message requesting uplink assistance together with an indication of the transmitting UE's identifier (ID), and an identifier of the relay node according to the list to which the message was transmitted and a cell identifier identifying the cell in which the UE is transmitting.

S84. The relay node compares the received relay node ID transmitted by the UE with its own identifier to confirm that the UE was in fact transmitting to the relay node.

S86. At decision point S86 the relay node determines whether the identifier received in the relay assist request message is the same as its identifier in which case processing proceeds to decision point S88 otherwise processing terminates at end point S90.

At decision point S88 the relay node determines whether the cell ID in the relay assist request message received from the UE is the same as the cell identified to which the relay node is currently connected. If it is not then processing proceeds to terminate at step S90.

S92. If the relay node confirms that the cell identifier is the same as both the cell identifier to which the relay node is available to an eNodeB and the cell identifier received from the relay assist request message from the UE, then at step S92 the relay node performs a random access procedure in order to establish an RRC connection with the eNodeB 101.

S94. If the random access procedure was successful then processing proceeds to step S96. Otherwise processing terminates at step S90.

As step S96 the relay node performs an RRC connection establishment and exchanges the eNodeB identifier and the UE identifier with the eNodeB in order to establish an RRC connection as if the relay node was the UE.

S98. Once the relay node has established an RRC connection then the relay node sends back a relay response message to the UE with a identifier of the eNodeB. The UE waits for the relay response message for a predetermined time. If no feedback is received during the predetermined time, then the relay discovery fails and the UE check if all the relay nodes in the list have been contacted. If yes, go to the next step; otherwise, the next relay node in the list is contacted. If a relay response message is received, then the relay node is found and the UE sends a relay select message to the relay node, indicating that a wireless link should be established.

S100. The relay node establishes a wireless link to the UE and to the eNodeB in order to perform its function as a relay for assisting uplink transmissions from the UE to the eNodeB.

Figure 9:
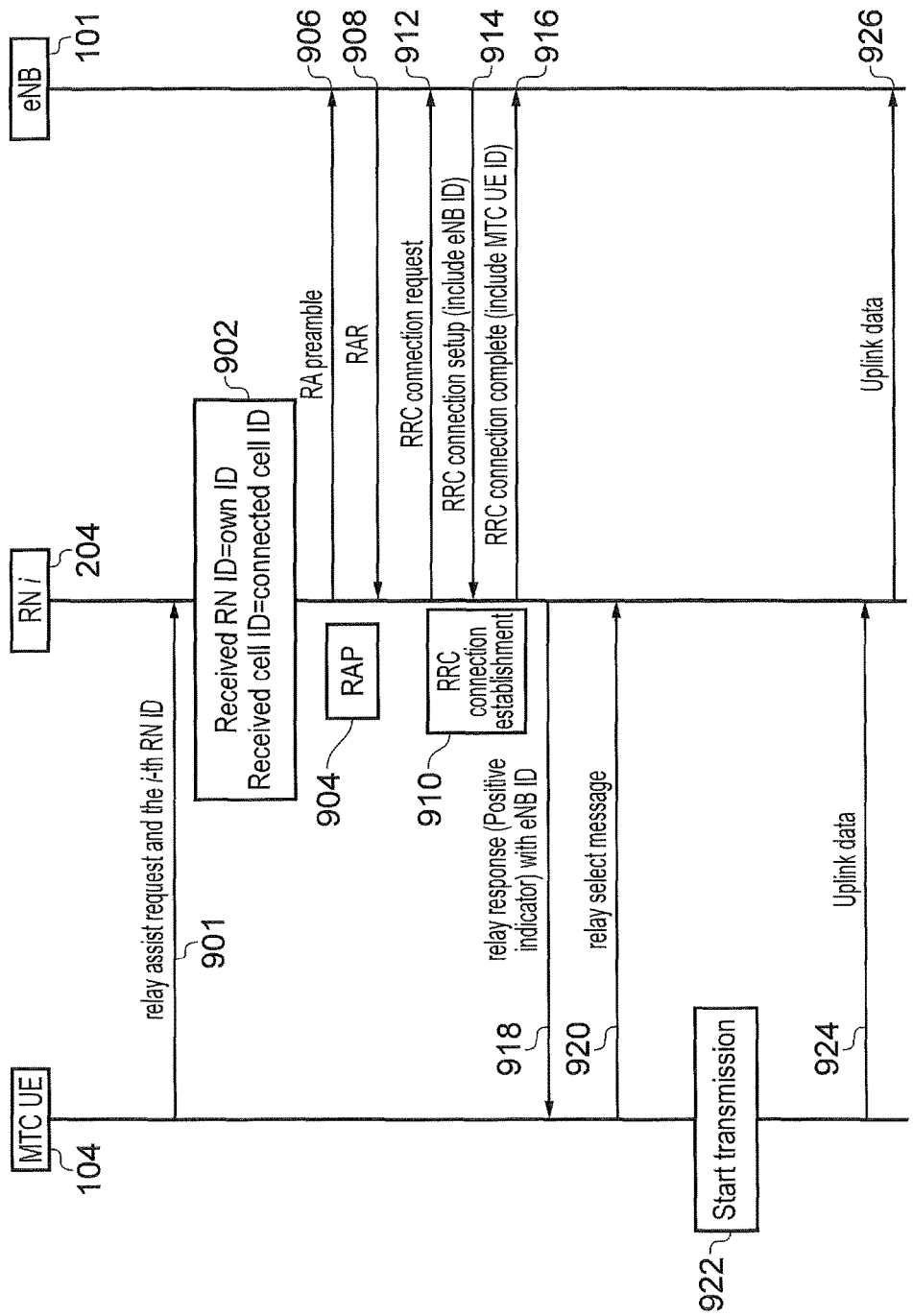
FIG. 9 is an illustrative representation of a signalling exchange between a communications device (UE), a communications apparatus acting as a relay node and an infrastructure equipment (eNodeB) of a mobile communications network when performing a relay discovery process in which the communications apparatus is selected to operate as a relay node according to an example of the present technique.

A detailed message flow diagram supporting the two processes performed respectively at the UE requiring assistance and the relay node shown in FIGS. 7 and 8 is provided in FIG. 9 which is summarised as follows:

In the first message transmission 901 the UE 104 transmits a message to the i-th relay node 204 providing an indication that the relay node 204 wishes to receive relay assistance for uplink transmissions from the UE 104 to the eNodeB 101. In a process 902 the relay node performs the steps S84, S86, S88 in order to compare the identifier (ID) of the relay node with the ID identified in the message 901 received from the UE which includes an identifier of that i-th relay node.

In a random access procedure 904 the i-th relay node performs the steps S92, S94 shown in FIG. 8 by transmitting a random access preamble 906 and receives a corresponding response 908 from the eNodeB (Random Access Response (RAR) message). Accordingly, once the random access procedure 904 is successful, the i-th relay node moves to a phase in which it establishes an RRC connection represented by procedure 910 by transmitting an RRC connection request message 912 receiving an RRC connection set up message 914 and transmitting an RRC complete message 916. However, message 914 transmitted by the eNodeB 101 to the relay node 204 includes an ID of the eNodeB so that the i-th relay node can inform the UE 104 of the identity of the eNodeB to which it is transmitting uplink messages. Correspondingly, the RRC complete message 916 includes an identifier of the UE 104 which is transmitting on the uplink so that the eNodeB can identify the UE 104 for which the RRC connection establishment has been made.

In accordance with the process step S98 shown in FIG. 8, the i-th relay node then transmits a relay response message with an identifier of the eNodeB 901 to the UE 104 which is then confirmed by the UE 104 by transmitting a relay select message 920 (e.g. a positive confirmation bit or flag).

Having established an RRC connection with the eNodeB for the UE 104 via the relay node 204, the UE can start transmitting on the uplink 922 using messages transmitted from the UE 104 to the eNodeB 204 as uplink data 924 and then from the relay node 204 to the eNodeB using a message transmission 926.

Figure 10:
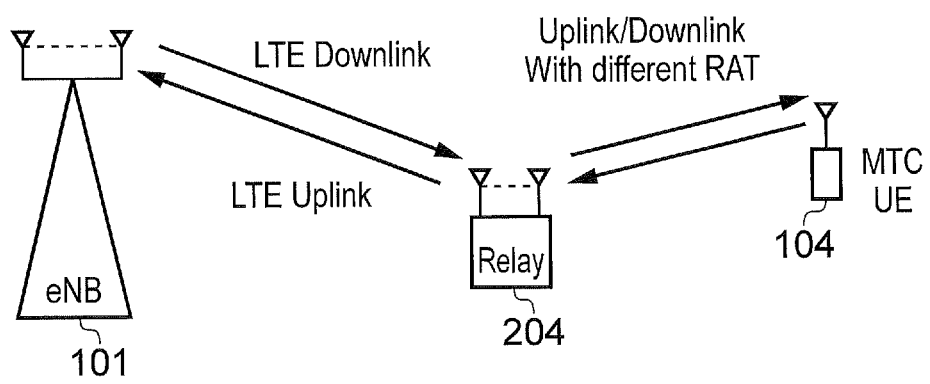
FIG. 10 is an illustrative block diagram of an arrangement of a communications device (UE), a communications apparatus acting as a relay node and an infrastructure equipment (eNodeB) of a mobile communications network when a down-link is not available, to that signals transmitted by the infrastructure equipment cannot reach the communications device.
Figure 11:
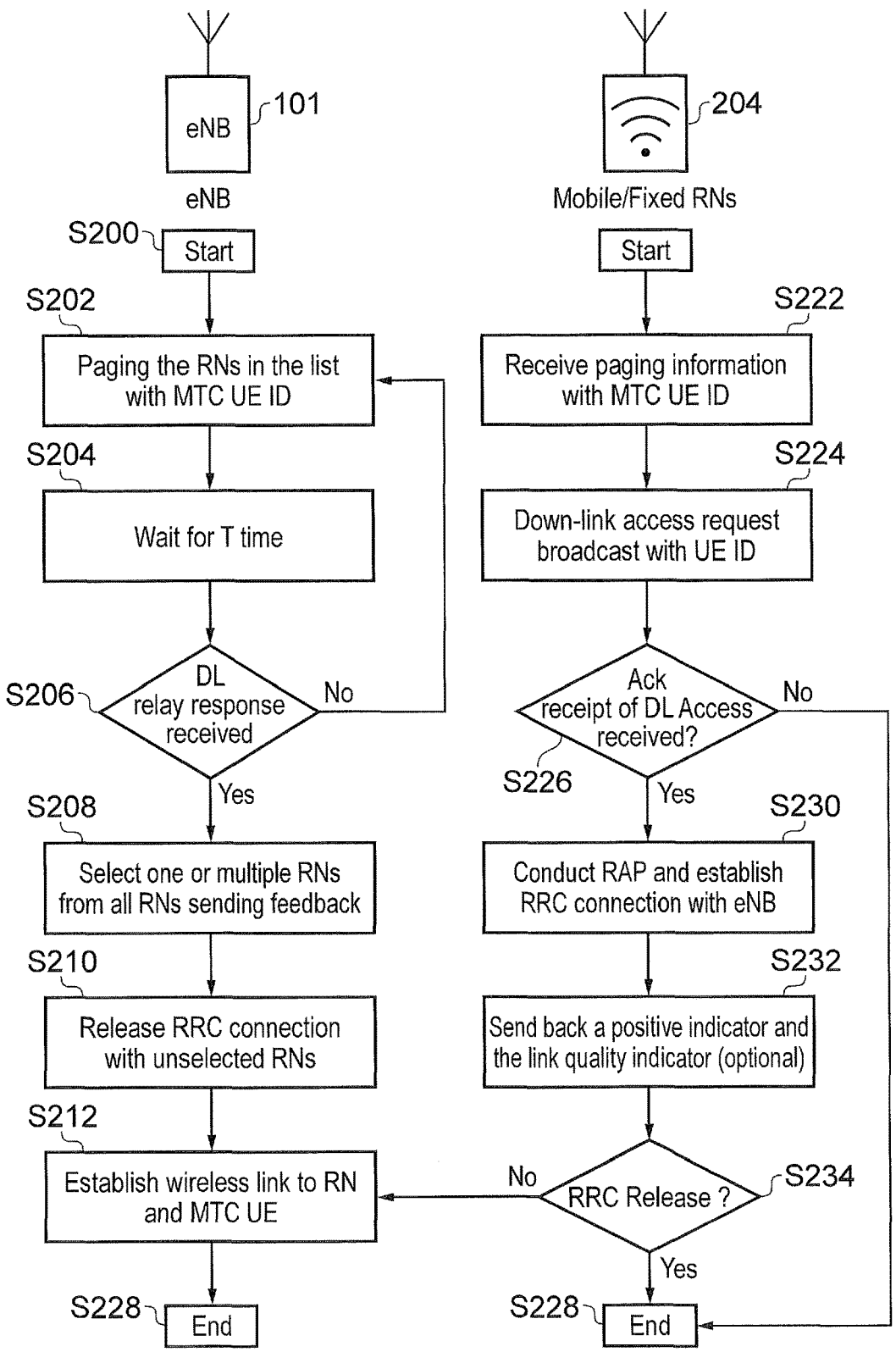
FIG. 11 is an illustrative flow diagram representing example operation of an infrastructure equipment (eNodeB) of a mobile communications network and a communications apparatus operating as a relay node, in which the infrastructure equipment performs a down-link communication by discovering a communications device using the communications apparatus operating as a relay node according to the present technique.

In some examples, a relay node may be required to assist a UE in both downlink as well as uplink communications, by relaying signals received from the eNode for transmission to the UE. For example power boosting, which is an increase in the transmission power of signals by the eNodeB for the UE may not be available at some time of the day. As such a downlink connection between the eNodeB and the MTC UE may not available as shown in FIG. 10. According to the present technique for this an example of a discovery procedure for an eNodeB to identify a suitable relay node is shown in FIG. 11, in which the eNodeB transmits a paging message, which is received by a relay node and identified by the relay node as an indication that the UE is unable to receive transmissions from the eNodeB and therefore the relay node must facilitate both the downlink and well as the uplink communication.

An example embodiment of the present technique which represents a discovery procedure for an eNodeB to discover a relay node to assist in downlink communications from the eNodeB to a UE is provided in FIG. 11, which is summarised as follows:

S200. At a start the eNodeB has already identified that the UE is present in the cell and therefore has the identifier of the UE.

S202. The eNodeB begins by paging the relay nodes in the list of available relay nodes within the cell. The paging message includes an identifier of the UE for which it wishes to transmit data on the downlink to the UE. This is done by transmitting a downlink access request message or paging message, which includes the UEs identifier (ID).

S204. The eNodeB then waits for a predetermined time T to receive a response message from the relay node to the paging message transmitted by the eNodeB on the downlink of the LTE radio access interface. At decision point S206 the eNodeB determines whether it has received a paging response message from one of the relay nodes 204 in which case processing proceeds to step S208 or the eNodeB reverts back to step S202 and attempts to page a next one of the relay nodes in the list of available relay nodes.

S208. The eNodeB then selects one or more of the available relay nodes, which provided feedback to the eNodeB that these relay nodes from the list are available to act as a relay node for the UE on the downlink.

S210. Those relay nodes which did not respond to the paging request then have their RRC connection released and these relay nodes are not selected.

S212. The eNodeB then establishes a wireless access link to the relay node and the UE in combination with the steps performed by the relay node.

S220. At the start the relay node is operating within a cell of the network in which the corresponding eNodeB 104 is present.

S222. The relay node receives the paging message transmitted by the eNodeB which includes the identifier of the UE which requires relay assistance which may be both uplink and downlink. In accordance with the example of LTE, this is achieved. In one example of an LTE wireless access interface, the relay nodes check the PDCCH. If there is a paging message in the PDCCH then the relay nodes check the paging channel in the identified PDSCH and obtain the target MTC UE ID.

S224. The relay node then broadcasts a downlink access request message which includes the UE's identifier to UE's within its vicinity. The relay node transmits the downlink access request message via a radio access technology which is available to it such as the WiFi channel. The downlink access request message includes an identifier of the UE. Each surrounding UE receives the downlink access request message and compares it with its own Identifier. If they match, the UE conducts link quality measurement and then sends back a positive indicator in the form of a downlink acknowledgement message and the link quality indicator (optional) to the Relay Node.

At decision point S226, the relay node determines whether it receives a response from the UE identified with a UE identifier in the form of the downlink acknowledgement message. If no response is received then process terminates at step S228. Otherwise processing proceeds at step S230 and the relay node conducts a random access procedure and establishes an RRC connection with an eNodeB. As part of this procedure the relay node confirms to the eNodeB that it has established a connection procedure with the UE identified by the UE identifier. Accordingly, in step S232 the relay node transmits a confirmation message providing a positive indicator and optionally an indication of the link quality which is available with the eNodeB. The eNodeB then select one or more of the relay nodes from all relay nodes sending back feedback information.

At decision point S234 the relay node 204 determines whether it should release the RRC connection establishment or not. If the relay node is to establish a wireless link with the MTC UE then processing proceeds to step S212 as explained above in order to establish a wireless link between the eNodeB and the relay node for the MTC UE and from the relay node to the MTC UE. Otherwise processing proceeds to terminate at step S228.

Figure 12:
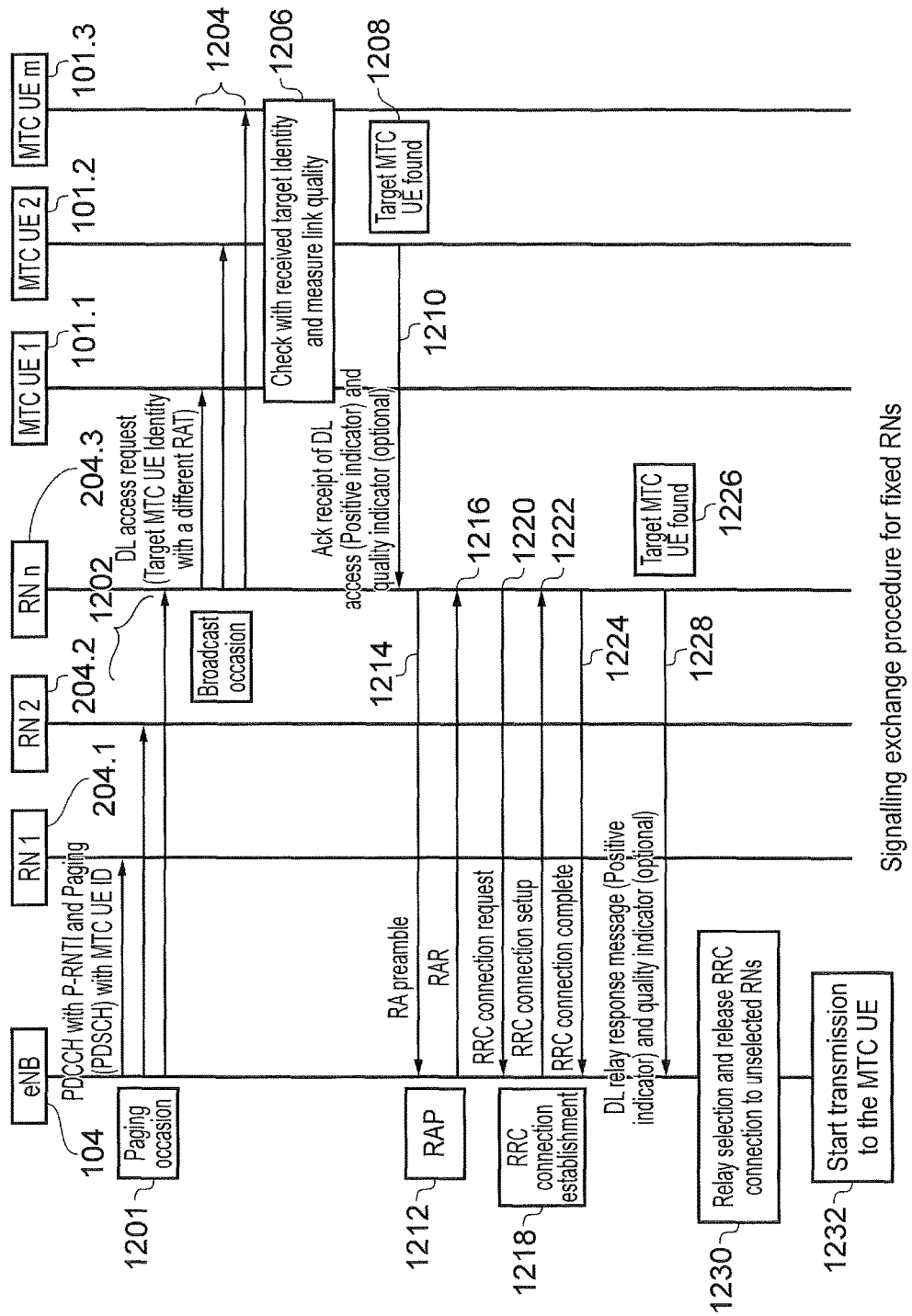
FIG. 12 is an illustrative representation of a signalling exchange between a infrastructure equipment (eNodeB) of a mobile communications network, one or more communications apparatus acting as relay nodes and one or more communications devices (UE) when performing the down-link communication by discovering a communications device using the communications apparatus operating as a relay node according to the present technique.

A more detailed signalling exchange corresponding to the method and procedure provided in FIG. 11 is showing in FIG. 12 which is described as follows:

As a first step the eNodeB begins by paging the MTC UE by transmitting a downlink PDCCH message with the P-RNTI of the UE, for which the UE recovers the paging message from the PDSCH which includes in accordance with a conventional arrangement the ID of the UE which is to receive downlink communication. Thus the messages 1202 represent paging messages which can be received by any one of the relay nodes 204.1, 204.2, 204.3. In a process step 1204 the relay node which receives the paging message in the PDSCH as if it were the UE identified by the UE identifier and transmits via a different radio access technology, such as WiFi, a downlink access request message, which includes the UE's identifier, in anticipation that this can be received within a transmission range of the relay node for example from the WiFi transmitter. The transmission by the relay node could be received by any one of the UE's which are within its vicinity 104.1, 104.2, 104.3. However only one of these will have the same identifier as the identifier in the downlink access request message and correspondingly the identifier present in the paging message transmitted by the eNodeB 101. In a process 1206 each of the UEs which received the downlink access request message from a relay node 204.3 determines whether it has been identified from the corresponding UE identifier present downlink access request message. If the UE does recognise the identifier in the downlink access request message then the target UE performs a process 1208 in which it transmits a positive indicator message back to the relay node 204.3 providing an indication 1210 that the identified UE has been found within a transmission and reception range of the relay node 204.3 which can therefore act as a relay node for that UE.

Having received a positive indicator from the UE, the relay node 204.3 performs a random access procedure 1212 by transmitting a random access preamble message 1214 and in response the eNodeB transmits a random access response message 1216 in accordance with a conventional arrangement. However, having received the random access response message 1212, the relay node 204.3 performs a RRC connection establishment procedure by transmitting an RRC connection request message 1220 and receives in response from an eNodeB 101 an RRC connection set up message 1222 and a RRC connection establishment is completed by an RRC connection complete message 1224. The relay node 204.3 then transmits an indication to the eNodeB 104 through the established connection that it has found the UE identified by the eNodeB in the paging message 1226 and transmits a positive indicator and optionally an indication of the signal quality level which is available for transmission to the UE 1228.

Any relay nodes which responded to the paging messages 1202 which sought to establish an RRC connection are then released in a process step 1230 so that the preferred relay node is selected and the unselected relay nodes have their RRC connection released. Finally, the eNodeB begins to transmit on the downlink to the UE 104 as represented by a process box 1234.

The embodiments of the present technique therefore provide an arrangement in which UE's which are out of coverage range of an eNodeB for uplink transmissions and downlink transmissions can discover relay nodes which are either fixed relay nodes or ad hoc relay nodes. Accordingly the present technique can provide the following advantages and features:

- relay node discovery can be done either by the UE independently from eNodeB, or by the eNodeB as a part of established protocols;
- Both downlink and uplink are covered and corresponding eNodeB and UE initiated relay discovery schemes are provided;
- Any LTE UEs with the relevant RAT can act as relay nodes to facilitate the communications between MTC devices and the eNodeB, which can increase a probability to assist MTC devices in poor coverage areas;
- Network memory, i.e. the a priori information of relay nodes having been used in the cell, can be exploited to simplify a relay discovery process;
- Network memory is exploited to optimise a list of available relay nodes for each individual UE;
- A static or dynamic list of all potential relay nodes is kept at the eNodeB to simplify the discovery and signalling process;
- Inter-RAT technique is considered, where the radio link between the relay node and the MTC device may be different from the (LTE) radio link between the relay node and the eNodeB;
- Unlike current 3GPP standards, where relay nodes are more like a small cell with wireless backhaul connections to the eNodeB, any LTE UE can act as a relay node as long as it supports the required RAT between the MTC UE and relay node. It is an evolution from eNodeB-centric network paradigm to user-centric network paradigm.
- Considering the low mobility of MTC UEs, network memory is exploited to reduce signalling overhead.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

1. A communications device, the communications device comprising a transmitter configured to transmit signals representing data to an infrastructure equipment of a mobile communications network via a first wireless access interface and to transmit signals via a second wireless access interface to one or more communications apparatus which can act as relay nodes, a receiver configured to receive signals from the infrastructure equipment of the mobile communications network via the first wireless access interface and to receive signals via the second wireless access interface from the one or more communications apparatus which can act as relay nodes, and a controller configured to control the transmitter and the receiver, wherein the controller is configured to form a relay assist request message and in combination with the transmitter and the receiver to transmit the relay assist request message on the second wireless access interface for reception by the one or more communications apparatus which can act as relay nodes to assist in communicating signals representing data to the infrastructure equipment via the first wireless access interface, to receive from at least one of the communications apparatus, via the second wireless access interface, a relay response message providing an indication that the communications apparatus can act as a relay node for the communications device, and to transmit signals representing the data, for transmission to the infrastructure equipment, to the communications apparatus acting as a relay node via the second wireless access interface.

2. A communications device according to clause 1, wherein the relay assist request message is transmitted by the transmitter to the one or more communications apparatus which can act as relay nodes via the second wireless access interface, and the relay response message received from by the at least one communications apparatus includes an identifier which identifies the communications apparatus which can act as a relay node, and the controller in combination with the receiver and the transmitter are configured to receive the relay response message from a plurality of the one or more communications apparatus acting as relay nodes, to identify each of the communications apparatus acting as relay nodes from the identifier received in the relay response message, to select one or more of the identified communications apparatus to act as relay nodes for the communications device, and to transmit the signals representing the data, for transmission to the infrastructure equipment, to the one or more selected communications apparatus acting as relay nodes via the second wireless access interface.

3. A communications device according to clause 1, wherein the controller in combination with the receiver and the transmitter are configured to receive from the infrastructure equipment via the first wireless access interface data representing a list of the one or more communications apparatus which can act as relay nodes for the communications device, to transmit the relay assist request message to at least one of the one or more communications apparatus which can act as relay nodes which are identified in the list received from the infrastructure equipment.

4. A communications device according to clause 3, wherein the controller is configured in combination with the receiver and the transmitter to transmit the relay assist request message to one or more of the communications apparatus which can act as relay nodes which are identified in the list received from the infrastructure equipment in an order determined in accordance with an established preference.

5. A communications device according to clause 3 or 4, wherein the controller in combination with the receiver and the transmitter are configured to receive in response to transmitting the relay assist request message, the relay response message from at least one of the one or more communications apparatus identified from the list which can act as a relay node, the relay response message providing an indication that the communications apparatus from which the relay response message was received will act as a relay node for the communications apparatus, and to transmit signals representing the data for transmission to the infrastructure equipment to the at least one communications apparatus acting as a relay node via the second wireless access interface.

6. A communications device according to clause 3, 4 or 5, wherein the controller is configured in combination with the receiver and the transmitter to receive in response to transmitting the relay assist request message, the relay response message from a plurality of the one or more communications apparatus identified from the list which can act as relay nodes, the relay assist response message providing an indication that the communications apparatus from which the relay assist response message was received will act as a relay node for the communications apparatus, to select one or more of the communications apparatus, from which the relay response messages were received, to act as relay node for the communications device, and to transmit the signals representing the data, for transmission to the infrastructure equipment, to the one or more selected communications apparatus acting as relay nodes via the second wireless access interface.

7. A communications device according to any of clauses 3 to 6, wherein the relay assist request message comprises an identifier of the communications apparatus which can act as a relay node to which the relay assist request message is transmitted for verification by the communications apparatus that the communications apparatus is being requested to act as a relay node in accordance with the list transmitted by the infrastructure equipment.

8. A communications device according to clause 5 or 6, wherein the controller is configured in combination with the receiver and the transmitter to store an indication of a communications apparatus which is selected to act as a relay node, and to determine the preference for transmitting the relay assist request message to the one or more of the communications apparatus in the list of communications apparatus which can act as relay nodes in accordance with whether the communications apparatus has previously acted as a relay node for the communications apparatus.

9. A communications device according to any of clauses 1 to 8, wherein the controller is configured to form the relay assist request message with an identifier of the communications device for use by the one or more communications apparatus which can act as relay nodes to identify the communications device when communicating the data to the infrastructure equipment via the first wireless access interface.

10. A communications device according to any of clauses 1 to 9, wherein the controller is configured to form the relay request message with an identifier of the cell of the mobile communications network served by the infrastructure equipment so that the one or more communications apparatus which can act as relay nodes can compare the identifier of the cell received with the relay assist request message with an identifier of a cell of the communications network served by the infrastructure equipment acquired by the communications apparatus, and if the identifier of the cell received with the relay assist request message is the same as the identifier of the cell acquired by the communications apparatus, the communications apparatus can determine that the communications apparatus can act as a relay node for the communications device, the relay response message providing an indication that the communications apparatus can act as a relay node for the communications device.

11. A communications device according to clause 10, wherein the relay response message includes an indication of an identifier of the infrastructure equipment for use by the communications device in transmitting the data to the infrastructure equipment via the communications apparatus acting as the relay node.

12. A communications device according to any of clauses 1 to 11, wherein the controller is configured in combination with the receiver and the transmitter to receive from one of the one or more communications apparatus which can act as relay nodes a down-link access request message via the second wireless access interface, the down-link access request message including an identifier of the communications device, to confirm that the down-link access request message was directed to the communications device using the identifier of the communications device received with the down-link access request message, to transmit an acknowledgement of receipt of the down-link access request message, to the communications apparatus acting as a relay node via the second wireless access interface, to receive signals representing data from the communications apparatus acting as a relay node, via the second wireless access interface, the data having been transmitted to the relay node from the infrastructure equipment via the first wireless access interface.

13. A method of communicating using a communications device in a mobile communications network, the communications device being configured to transmit signals representing data to an infrastructure equipment of a mobile communications network via a first wireless access interface and to receive signals from the infrastructure equipment of the mobile communications network via the first wireless access interface, the method comprising forming a relay assist request message, transmitting the relay assist request message via a second wireless access interface for reception by one or more communications apparatus which can act as relay nodes to assist in communicating signals representing data to the infrastructure equipment via the first wireless access interface, receiving from at least one of the communications apparatus, via the second wireless access interface, a relay response message providing an indication that the communications apparatus can act as a relay node for the communications device, and transmitting signals representing the data, for transmission to the infrastructure equipment, to the communications apparatus acting as a relay node via the second wireless access interface.

14. A method according to clause 13, wherein the transmitting the relay assist request message via a second wireless access interface comprises transmitting the relay assist request message to the one or more communications apparatus which can act as relay nodes via the second wireless access interface, and the receiving the relay response message comprises receiving the relay response message from a plurality of the one or more communications apparatus acting as relay nodes, the relay response message including an identifier which identifies the communications apparatus which can act as a relay node, identifying each of the communications apparatus acting as relay nodes from the identifier received in the relay response message, selecting one or more of the identified communications apparatus to act as relay nodes for the communications device, and the transmitting the signals representing the data, for transmission to the infrastructure equipment, to the communications apparatus acting as a relay node via the second wireless access interface comprises transmitting the signals representing the data, for transmission to the infrastructure equipment, to the one or more selected communications apparatus acting as relay nodes via the second wireless access interface.

15. A method according to clause 13, comprising receiving from the infrastructure equipment via the first wireless access interface data representing a list of the one or more communications apparatus which can act as relay nodes for the communications device, and the transmitting the relay assist request message via a second wireless access interface comprises transmitting the relay assist request message to one or more of the communications apparatus which can act as relay nodes which are identified in the list received from the infrastructure equipment.

16. A method according to clause 15, wherein the transmitting the relay assist request message comprises transmitting the relay assist request message to one or more of the communications apparatus which can act as relay nodes which are identified in the list received from the infrastructure equipment in an order determined in accordance with an established preference.

17. A communications apparatus configured to operate as a relay node, the communications apparatus comprising a receiver configured to receive signals from an infrastructure equipment of a mobile communications network via a first wireless access interface and to receive signals via a second wireless access interface from communications devices, a transmitter configured to transmit signals to the infrastructure equipment of the mobile communications network via the first wireless access interface and to transmit signals to the communications devices via the second wireless access interface, and a controller is configured in combination with the transmitter and the receiver to receive a relay assist request message via the second wireless access interface from one of the communications devices, the relay assist request message representing a request to the communications apparatus to act as relay node to assist in communicating signals representing data received from the communications device for transmission to the infrastructure equipment via the first wireless access interface, to transmit, via the second wireless access interface, a relay response message providing an indication that the communications apparatus can act as a relay node for the communications device, and to receive signals representing data for transmission to the infrastructure equipment from the communications device via the second wireless access interface, and to transmit to the infrastructure equipment via the first wireless access interface signals representing the data received from the communications device.

18. A communications apparatus according to clause 17, wherein the controller is configured to form the relay response message to include an identifier which identifies the communications apparatus and that the communications apparatus will act as a relay node, and the controller in combination with the receiver are configured to receive from the communications device a relay selection message, providing an indication that the communications device has selected the communications apparatus to act as a relay node for the communications device, which was identified by the transmitted relay response message.

19. A communications apparatus according to clause 13, wherein the relay assist request message received by the receiver includes an indication of an identifier of the communications apparatus to which the relay assist request message was transmitted by the communications device via the second wireless access interface for verification by the communications apparatus that the communications apparatus is being requested to act as a relay node in accordance with the list transmitted by the infrastructure equipment, and to receive, from the communications device, after transmitting the relay response message, a relay selection message via the second wireless access interface, providing an indication that the communications device has selected the communications apparatus to act as a relay node for the communications device, which was identified by the transmitted relay response message.

20. A communications apparatus according to clause 19, wherein the controller in combination with the receiver and the transmitter are configured to transmit to the infrastructure equipment via the first wireless access interface data representing an indication that the communications apparatus can act as a relay node for the communications device.

21. A communications apparatus according to clause 20, wherein the controller is configured in combination with the transmitter and the receiver to transmit an indication that the communications apparatus can act as a relay node when the communication apparatus completes a handover to the infrastructure apparatus or attaches to the infrastructure apparatus or after a predetermined time.

22. A communications apparatus according to any of clauses 17 to 21, wherein the relay assist request message comprises an identifier of the communications device, and the controller is configured in combination with the transmitter and the receiver to perform a random access procedure via the first wireless communications interface, to establish a radio communications channel via the first wireless access interface with the infrastructure equipment as if the communications apparatus were a communications device, and to transmit as part of establishing the radio communications channel via the first wireless access interface the identifier of the communications device which was received in the relay assist request message.

23. A communications apparatus according to any of clauses 17 to 22, wherein the relay assist request message includes an indication of an identifier of a cell of the mobile communications network served by the infrastructure equipment, and the controller is configured in combination with the transmitter and the receiver to compare the identifier of the cell received with the relay assist request message with an identifier of a cell of the communications network served by the infrastructure equipment acquired by the communications apparatus, and if the identifier of the cell received with the relay assist request message is the same as the identifier of the cell acquired by the communications apparatus, transmitting via the second wireless access interface, the relay response message providing an indication that the communications apparatus can act as a relay node for the communications device.

24. A communications apparatus according to clause 23, wherein if the identifier of the cell received with the relay assist request message is not the same as the identifier of the cell acquired by the communications apparatus, not transmitting the relay response message providing an indication that the communications apparatus can act as a relay node for the communications device, or transmitting the relay response message providing an indication that the communications apparatus cannot act as a relay node for the communications device.

25. A communications apparatus according to clause 23 or 24, wherein the controller is configured in combination with the transmitter and the receiver to acquire the identifier of the cell of the communications network served by the infrastructure equipment acquired by the communications apparatus by performing a random access procedure via the first wireless communications interface, establishing a radio communications channel via the first wireless access interface with the infrastructure equipment as if the communications apparatus were a communications device, and receiving as part of establishing the radio communications channel via the first wireless access interface the identifier of the cell.

26. A communications apparatus according to any of clauses 17 to 25, wherein the controller is configured in combination with the transmitter and the receiver to receive from the infrastructure a paging message via the first wireless access interface, which includes an identifier of one of the one or more communications devices, to transmit a down-link access request message via the second wireless access interface for receipt by the communications device, to receive an acknowledgement of receipt of the down-link access message, from the communications device via the second wireless access interface, in response to receiving the acknowledgement of receipt of the down-link access message, to perform a random access procedure via the first wireless communications interface, to establish a radio communications channel via the first wireless access interface with the infrastructure equipment as if the communications apparatus were a communications device, to receive data from the infrastructure via the established radio communications channel of the first wireless access interface, and to transmit to the communications device, via the second wireless access interface, the data received from the infrastructure equipment for the communications device.

27. A communications apparatus according to clause 26, wherein the controller is configured in combination with the transmitter and the receiver to receive from the infrastructure equipment an identifier of the infrastructure equipment for which the radio communications channel has been established, and to transmit to the communications device the identifier of the infrastructure equipment for use by the communications device in transmitting data to the infrastructure equipment via the communications apparatus acting as a relay node.

28. A method assisting communications between communications devices and an infrastructure equipment of a mobile communications network using a communications apparatus configured to operate as a relay node, the method comprises receiving signals from the infrastructure equipment of the mobile communications network via a first wireless access interface, transmitting signals to the infrastructure equipment of the mobile communications network via the first wireless access interface, receiving a relay assist request message via a second wireless access interface from one of the communications devices, the relay assist request message representing a request to the communications apparatus to act as relay node to assist in communicating signals representing data received from the communications device for transmission to the infrastructure equipment via the first wireless access interface, transmitting, via the second wireless access interface, a relay response message providing an indication that the communications apparatus can act as a relay node for the communications device, wherein the receiving signals from the infrastructure equipment of the mobile communications network via the first wireless access interface includes receiving signals representing the data for transmission to the infrastructure equipment from the communications device via the second wireless access interface, and the transmitting the signals to the infrastructure equipment of the mobile communications network via the first wireless access interface includes transmitting to the infrastructure equipment via the first wireless access interface signals representing the data received from the communications device.

29. A method according to clause 28, wherein the transmitting, via the second wireless access interface, the relay response message includes forming the relay response message to include an identifier which identifies the communications apparatus and that the communications apparatus will act as a relay node, and transmitting the relay response message, and the method includes receiving from the communications device a relay selection message, providing an indication that the communications device has selected the communications apparatus to act as a relay node for the communications device, which was identified by the transmitted relay response message.

30. A method according to clause 28, wherein the relay assist request message includes an indication of an identifier of the communications apparatus to which the relay assist request message was transmitted by the communications device via the second wireless access interface, and the method comprises verificating that the communications apparatus is being requested to act as a relay node in accordance with a list of communications apparatus which can act as relay nodes transmitted by the infrastructure equipment to the communications devices, and receiving, from the communications device, after transmitting the relay response message, a relay selection message via the second wireless access interface, providing an indication that the communications device has selected the communications apparatus to act as a relay node for the communications device, which was identified by the transmitted relay response message.

31. An infrastructure equipment for forming part of a mobile communications network for transmitting data to communications devices or receiving data from communications devices, the infrastructure equipment comprising a transmitter configured to transmit signals representing data to the communications devices via a first wireless access interface, a receiver configured to receive signals from the communications devices via the first wireless access interface, and a controller for controlling the transmitter and the receiver, the controller being configured to receive an indication from each of one or more communications apparatus, that the communications apparatus can act as a relay node for one or more communications devices by transmitting signals to the one or more communications devices or receiving signals from the one or more communications devices via a second wireless access interface, which is different and mutually exclusive from the first wireless access interface, to compile a list of the one or more communications apparatus which can act as relay nodes for the one or more communications device, and to transmit data representing the list to one or more communications devices for use in providing the communications devices with a facility for any of the one or more communications apparatus to act as a relay node for any of the one or more communications devices.

32. An infrastructure equipment according to clause 31, wherein the controller is configured in combination with the transmitter and the receiver to receive the indication from one or more of the communications apparatus that the communications apparatus can act as a relay node for one or more communications devices after the communications apparatus performs a handover to the infrastructure equipment, or attaches to the infrastructure equipment.

33. An infrastructure equipment according to clause 31, wherein the controller is configured in combination with the transmitter to transmit the data as a broadcast information via the first wireless access interface for reception by the one or more communications devices.

34. An infrastructure equipment according to clause 31, wherein the controller is configured in combination with the transmitter and receiver to transmit a paging message via the first wireless access interface, which includes an identifier of one of the communications devices for which the infrastructure equipment has data to transmit, to respond to a random access procedure via the first wireless communications interface, by establishing a radio communications channel via the first wireless access interface with one of the communications apparatus acting as a relay node for the one communications device as if the communications apparatus were the communications device, and to transmit the data from the infrastructure via the established radio communications channel of the first wireless access interface to the communications apparatus acting as a relay node for transmission to the communications device, via the second wireless access interface.

35. A method of communicating using an infrastructure equipment forming part of a mobile communications network with communications devices, the method comprises transmitting signals representing data to the communications devices via a first wireless access interface, receiving signals from the communications devices via the first wireless access interface, receiving an indication from each of one or more communications apparatus via the first wireless communications interface, that the communications apparatus can act as a relay node for one or more of the communications devices by transmitting signals to the one or more communications devices or receiving signals from the one or more communications devices via a second wireless access interface, which is different and mutually exclusive from the first wireless access interface, compiling a list of the one or more communications apparatus which can act as relay nodes for the one or more communications device, and transmitting via the first wireless access interface data representing the list to one or more communications devices for use in providing the communications devices with a facility for any of the one or more communications apparatus to act as a relay node for any of the one or more communications devices.

REFERENCES

[1] A. K Othman, A. E. Adams, and C. C. Tsimenidis, "A node discovery protocol for ad hoc underwater acoustic networks," in Proc. of AICT-ICIW'06, February 2006.

[2] Arash Asadi, Qing Wang, and Vincenzo Mancuso, "A Survey on Device-to-Device Communication in Cellular Networks," accepted by IEEE Communications Surveys and Tutorials.

[3] L. Lei and Y. Kuang, "Node/Peer discovery, Mode Selection, and Signaling for D2D Communications in LTE-A Band," online at http://link.springer.com/chapter/10.1007/978-3-319-04963-2_3.

[4] N. Bulusu., J. Heidemann, D. Estrin, and T. Tran, "Selfconfiguring localization systems: Design and experimental evaluation," *Trans. On Embedded Computing Sys.* 3(1), pp. 24-60, 2004

[5] M. J. Mc Glynn, and S. A Borbash, "Birthday Protocols for Low Energy Deployment and Flexible Neighbour Discovery in Ad Hoc Wireless Network," in *Proceeding of the 2nd ACM International Symposium on Mobile AdHoc Networking & Computing,* 2001.

[6] Y. Xu, J. Heidemann and D. Estrin, "Geography-informed Energy Conservation for Adhoc Routing," in *Proceeding of the 7th Annual International Conference on Mobile Computing and Networking,* 2001.

[7] V. Dyo, and C. Mascolo, "Efficient Node Discovery in Mobile Wireless Sensor Networks," online at http://link.springer.com/chapter/10.1007%2F978-3-540-69170-9_33.

[8] 3GPP TR 36.888, "Study on provision of low-cost machine communications user equipments based on LTE," v12.0.0, June 2013

[9] Y. Qi, M. A. Imran, D. Sebella, B. Debaillie, R. Fantini and Y. Fernandes, "On the deployment opportunities for increasing energy efficiency in LTE-Advanced with relay nodes," in *Proc. of WWRF* 2012.

[10] Y. Qi, R. Hoshyar, M. A. Imran, R. Tafazolli, "$H^2$-ARQ_relaying: spectrum and energy efficiency perspectives" *IEEE J. Sel. Area. in Comm.,* vol. 29, No. 8, September 2011.

[11] S. Sesia et al. "LTE—The UMTS Long Term Evolution from Theory to Practice," 2nd ed. Chichester, United Kingdom: J. Wiley & Sons. Ltd., 2011.

[12] Bo Xing1, Karim Seada2, and Nalini Venkatasubramanian, "An Experimental Study on Wi-Fi Ad-Hoc Mode for Mobile Device-to-Device Video Delivery," in Proceeding of IEEE INFOCOM 2009, pp. 1-6, Rio de Janeiro, April 2009.

The invention claimed is:

1. A communications device, the communications device comprising:

a transmitter configured to transmit signals representing data to an infrastructure equipment of a mobile communications network via a first wireless access interface and to transmit signals via a second wireless access interface to one or more communications apparatus which can act as relay nodes;

a receiver configured to receive signals from the infrastructure equipment of the mobile communications network via the first wireless access interface and to receive signals via the second wireless access interface from the one or more communications apparatus which can act as relay nodes; and a controller configured to control the transmitter and the receiver, wherein the controller is configured to form a relay assist request message and in combination with the transmitter and the receiver to receive from the infrastructure equipment via the first wireless access interface data representing a list of the one or more communications apparatus which can act as relay nodes for the communications device;

transmit the relay assist request message to at least one of the one or more communications apparatus which can act as relay nodes which are identified in the list received from the infrastructure equipment on the second wireless access interface for reception by the at least one of the one or more communications apparatus which can act as relay nodes to assist in communicating signals representing data to the infrastructure equipment via the first wireless access interface;

receive from the at least one of the communications apparatus, via the second wireless access interface, a relay response message providing an indication that the communications apparatus can act as a relay node for the communications device; and transmit signals representing the data, for transmission to the infrastructure equipment, to the communications apparatus acting as a relay node via the second wireless access interface.

2. The communications device of claim 1, wherein
the relay assist request message is transmitted by the transmitter to a plurality of communications apparatuses which can act as relay nodes via the second wireless access interface, and the relay response message received from the plurality of communications apparatuses includes an identifier which identifies the communications apparatus which can act as a relay node, and
the controller in combination with the receiver and the transmitter are configured to
receive the relay response message from the plurality of communications apparatuses acting as relay nodes;
identify each of the communications apparatuses acting as relay nodes from the identifier received in the relay response message;
to select one or more of the identified communications apparatuses to act as relay nodes for the communications device; and
transmit the signals representing the data, for transmission to the infrastructure equipment, to the one or more selected communications apparatuses acting as relay nodes via the second wireless access interface.

3. The communications device of claim 1, wherein
the controller is configured in combination with the receiver and the transmitter to transmit the relay assist request message to one or more of the communications apparatus which can act as relay nodes which are identified in the list received from the infrastructure equipment in an order determined in accordance with an established preference.

4. The communications device of claim 1, wherein the controller in combination with the receiver and the transmitter are configured to:
receive in response to transmitting the relay assist request message, the relay response message from at least one of the one or more communications apparatus identified from the list which can act as a relay node, the relay response message providing an indication that the communications apparatus from which the relay response message was received will act as a relay node for the communications apparatus; and
transmit signals representing the data for transmission to the infrastructure equipment to the at least one communications apparatus acting as a relay node via the second wireless access interface.

5. The communications device of claim 1, wherein the controller is configured in combination with the receiver and the transmitter to:
receive in response to transmitting the relay assist request message, the relay response message from a plurality of the one or more communications apparatus identified from the list which can act as relay nodes, the relay assist response message providing an indication that the communications apparatus from which the relay assist response message was received will act as a relay node for the communications apparatus;
select one or more of the communications apparatus, from which the relay response messages were received, to act as relay node for the communications device; and
transmit the signals representing the data, for transmission to the infrastructure equipment, to the one or more selected communications apparatus acting as relay nodes via the second wireless access interface.

6. The communications device of claim 1, wherein the relay assist request message comprises an identifier of the communications apparatus which can act as a relay node to which the relay assist request message is transmitted for verification by the communications apparatus that the communications apparatus is being requested to act as a relay node in accordance with the list transmitted by the infrastructure equipment.

7. The communications device of claim 4, wherein the controller is configured in combination with the receiver and the transmitter to:
store an indication of a communications apparatus which is selected to act as a relay node; and
determine the preference for transmitting the relay assist request message to the one or more of the communications apparatus in the list of communications apparatus which can act as relay nodes in accordance with whether the communications apparatus has previously acted as a relay node for the communications apparatus.

8. The communications device of claim 1, wherein
the controller is configured to form the relay assist request message with an identifier of the communications device for use by the one or more communications apparatus which can act as relay nodes to identify the communications device when communicating the data to the infrastructure equipment via the first wireless access interface.

9. The communications device of claim 1, wherein the controller is configured to form the relay request message with an identifier of the cell of the mobile communications network served by the infrastructure equipment so that the one or more communications apparatus which can act as relay nodes can compare the identifier of the cell received with the relay assist request message with an identifier of a cell of the communications network served by the infrastructure equipment acquired by the communications apparatus, and if the identifier of the cell received with the relay assist request message is the same as the identifier of the cell acquired by the communications apparatus, the communications apparatus can determine that the communications apparatus can act as a relay node for the communications device, the relay response message providing an indication that the communications apparatus can act as a relay node for the communications device.

10. The communications device of claim 9, wherein the relay response message includes an indication of an identifier of the infrastructure equipment for use by the communications device in transmitting the data to the infrastructure equipment via the communications apparatus acting as the relay node.

11. A communications device, the communications device comprising:
a transmitter configured to transmit signals representing data to an infrastructure equipment of a mobile communications network via a first wireless access interface and to transmit signals via a second wireless access interface to one or more communications apparatus which can act as relay nodes;
a receiver configured to receive signals from the infrastructure equipment of the mobile communications network via the first wireless access interface and to receive signals via the second wireless access interface from the one or more communications apparatus which can act as relay nodes; and
a controller configured to control the transmitter and the receiver, wherein the controller is configured to form a relay assist request message and in combination with the transmitter and the receiver to transmit the relay assist request message on the second wireless access interface for reception by the one or more communications apparatus which can act as relay nodes to assist in communicating signals representing data to the infrastructure equipment via the first wireless access interface;

receive from one of the one or more communications apparatus which can act as relay nodes a down-link access request message via the second wireless access interface, the down-link access request message including an identifier of the communications device confirm that the down-link access request message was directed to the communications device using the identifier of the communications device received with the down-link access request message;

transmit an acknowledgement of receipt of the down-link access request message, to the communications apparatus acting as a relay node via the second wireless access interface and receive signals representing data from the communications apparatus acting as a relay node, via the second wireless access interface, the data having been transmitted to the relay node from the infrastructure equipment via the first wireless access interface.

12. A method of communicating using a communications device in a mobile communications network, the communications device being configured to transmit signals representing data to an infrastructure equipment of a mobile communications network via a first wireless access interface and to receive signals from the infrastructure equipment of the mobile communications network via the first wireless access interface, the method comprising:

receiving from the infrastructure equipment via the first wireless access interface data representing a list of the one or more communications apparatus which can act as relay nodes for the communications device;

forming a relay assist request message;

transmitting the relay assist request message to one or more of the communications apparatus which can act as relay nodes which are identified in the list received from the infrastructure equipment via a second wireless access interface for reception by the one or more communications apparatus which can act as relay nodes to assist in communicating signals representing data to the infrastructure equipment via the first wireless access interface;

receiving from at the least one of the communications apparatus, via the second wireless access interface, a relay response message providing an indication that the communications apparatus can act as a relay node for the communications device; and transmitting signals representing the data, for transmission to the infrastructure equipment, to the communications apparatus acting as a relay node via the second wireless access interface.

13. The method of claim 12, wherein the transmitting the relay assist request message via a second wireless access interface comprises transmitting the relay assist request message to a plurality of communications apparatuses which can act as relay nodes via the second wireless access interface, and the receiving the relay response message comprises:

receiving the relay response message from the plurality of communications apparatuses acting as relay nodes, the relay response message including an identifier which identifies the communications apparatus which can act as a relay node;

identifying each of the communications apparatuses apparatus acting as relay nodes from the identifier received in the relay response message;

selecting one or more of the identified communications apparatuses to act as relay nodes for the communications device; and the transmitting the signals representing the data, for transmission to the infrastructure equipment, to the communications apparatus acting as a relay node via the second wireless access interface comprises transmitting the signals representing the data, for transmission to the infrastructure equipment, to the one or more selected communications apparatus acting as relay nodes via the second wireless access interface.

14. The method of claim 12, wherein the transmitting the relay assist request message comprises transmitting the relay assist request message to one or more of the communications apparatus which can act as relay nodes which are identified in the list received from the infrastructure equipment in an order determined in accordance with an established preference.

15. A communications apparatus configured to operate as a relay node, the communications apparatus comprising a receiver configured to receive signals from an infrastructure equipment of a mobile communications network via a first wireless access interface and to receive signals via a second wireless access interface from communications devices;

a transmitter configured to transmit signals to the infrastructure equipment of the mobile communications network via the first wireless access interface and to transmit signals to the communications devices via the second wireless access interface; and a controller is configured in combination with the transmitter and the receiver to receive a relay assist request message via the second wireless access interface from one of the communications devices, the relay assist request message including an indication of an identifier of a cell of the mobile communications network served by the infrastructure equipment and representing a request to the communications apparatus to act as relay node to assist in communicating signals representing data received from the communications device for transmission to the infrastructure equipment via the first wireless access interface;

compare the identifier of the cell received with the relay assist request message with an identifier of a cell of the communications network served by the infrastructure equipment acquired by the communications apparatus;

if the identifier of the cell received with the relay assist request message is the same as the identifier of the cell acquired by the communications apparatus, transmit, via the second wireless access interface, a relay response message providing an indication that the communications apparatus can act as a relay node for the communications device; and receive signals representing data for transmission to the infrastructure equipment from the communications device via the second wireless access interface; and transmit to the infrastructure equipment via the first wireless access interface signals representing the data received from the communications device.

16. The communications apparatus of claim 15, wherein the controller is configured to form the relay response message to include an identifier which identifies the communications apparatus and that the communications apparatus will act as a relay node, and the controller in combination with the receiver are configured to receive from the communications device a relay selection message, providing an indication that the communications device has selected the communications apparatus to act as a relay node for the communications device, which was identified by the transmitted relay response message.

17. The communications apparatus of claim 15, wherein the relay assist request message received by the receiver includes an indication of an identifier of the communications apparatus from which the relay assist request message was transmitted by the communications device via the second wireless access interface for verification by the communications apparatus that the communications apparatus is being requested to act as a relay node in accordance with the list transmitted by the infrastructure equipment, and the controller in combination with the receiver and the transmitter are configured to receive, from the communications device, after transmitting the relay response message, a relay selection message via the second wireless access interface, providing an indication that the communications device has selected the communications apparatus to act as a relay node for the communications device, which was identified by the transmitted relay response message.

18. The communications apparatus of claim 17, wherein the controller in combination with the receiver and the transmitter are configured to transmit to the infrastructure equipment via the first wireless access interface data representing an indication that the communications apparatus can act as a relay node for the communications device.

19. The communications apparatus of claim 18, wherein the controller is configured in combination with the transmitter and the receiver to transmit an indication that the communications apparatus can act as a relay node when the communication apparatus completes a handover to the infrastructure apparatus or attaches to the infrastructure apparatus or after a predetermined time.

20. The communications apparatus of claim 15, wherein the relay assist request message comprises an identifier of the communications device, and the controller is configured in combination with the transmitter and the receiver
perform a random access procedure via the first wireless communications interface;
establish a radio communications channel via the first wireless access interface with the infrastructure equipment as if the communications apparatus were a communications device; and
transmit as part of establishing the radio communications channel via the first wireless access interface the identifier of the communications device which was received in the relay assist request message.

21. The communications apparatus of claim 15, wherein
if the identifier of the cell received with the relay assist request message is not the same as the identifier of the cell acquired by the communications apparatus, not transmitting the relay response message providing an indication that the communications apparatus can act as a relay node for the communications device, or transmitting the relay response message providing an indication that the communications apparatus cannot act as a relay node for the communications device.

22. The communications apparatus of claim 15, wherein the controller is configured in combination with the transmitter and the receiver to:
acquire the identifier of the cell of the communications network served by the infrastructure equipment acquired by the communications apparatus by performing a random access procedure via the first wireless communications interface;
establishing a radio communications channel via the first wireless access interface with the infrastructure equipment as if the communications apparatus were a communications device; and
receiving as part of establishing the radio communications channel via the first wireless access interface the identifier of the cell.

23. The communications apparatus of claim 15, wherein the controller is configured in combination with the transmitter and the receiver to:
receive from the infrastructure a paging message via the first wireless access interface, which includes an identifier of one of the one or more communications devices;
transmit a down-link access request message via the second wireless access interface for receipt by the communications device;
receive an acknowledgement of receipt of the down-link access message, from the communications device via the second wireless access interface;
in response to receiving the acknowledgement of receipt of the down-link access message, to perform a random access procedure via the first wireless communications interface;
establish a radio communications channel via the first wireless access interface with the infrastructure equipment as if the communications apparatus were a communications device;
receive data from the infrastructure via the established radio communications channel of the first wireless access interface; and
transmit to the communications device, via the second wireless access interface, the data received from the infrastructure equipment for the communications device.

24. The communications apparatus of claim 23, wherein the controller is configured in combination with the transmitter and the receiver to:
receive from the infrastructure equipment an identifier of the infrastructure equipment for which the radio communications channel has been established; and
transmit to the communications device the identifier of the infrastructure equipment for use by the communications device in transmitting data to the infrastructure equipment via the communications apparatus acting as a relay node.

* * * * *